US011836860B2

United States Patent
Chandran et al.

(10) Patent No.: US 11,836,860 B2
(45) Date of Patent: Dec. 5, 2023

(54) FACIAL ANIMATION RETARGETING USING A PATCH BLEND-SHAPE SOLVER

(71) Applicants: Disney Enterprises, Inc., Burbank, CA (US); ETH Zürich (Eidgenössische Technische Hochschule Zürich), Zürich (CH)

(72) Inventors: Prashanth Chandran, Zürich (CH); Loïc Florian Ciccone, Zürich (CH); Derek Edward Bradley, Zurich (CH)

(73) Assignees: Disney Enterprises, Inc., Burbank, CA (US); ETH Zürich (Eidgenössische Technische Hochschule Zürich), Zürich (CH)

(*) Notice: Subject to any disclaimer, the term of this patent is extended or adjusted under 35 U.S.C. 154(b) by 4 days.

(21) Appl. No.: 17/586,449

(22) Filed: Jan. 27, 2022

(65) Prior Publication Data
US 2023/0237739 A1    Jul. 27, 2023

(51) Int. Cl.
*G06T 15/00*   (2011.01)
*G06T 17/20*   (2006.01)
(Continued)

(52) U.S. Cl.
CPC .............. *G06T 17/20* (2013.01); *G06T 7/10* (2017.01); *G06T 13/40* (2013.01)

(58) Field of Classification Search
CPC ......... G06T 7/246; G06T 17/20; G06T 7/223; G06T 19/20; G06T 2219/2021;
(Continued)

(56) References Cited

U.S. PATENT DOCUMENTS 8,035,643 B2    10/2011  Pighin et al.
8,922,553 B1 *  12/2014  Tena ..................... G06T 13/40
                                                  345/473
(Continued)

OTHER PUBLICATIONS

Tena, J. R., De La Torre, F., and Matthews, I. 2011. Interactive region-based linear 3d face models. ACM Trans. Graphics (Proc. SIGGRAPH) 30, 4, 76:1-76:10.*
(Continued)

*Primary Examiner* — Phu K Nguyen
(74) *Attorney, Agent, or Firm* — KILPATRICK TOWNSEND & STOCKTON LLP

(57) ABSTRACT

Methods and systems for performing facial retargeting using a patch-based technique are disclosed. One or more three-dimensional (3D) representations of a source character's (e.g., a human actor's) face can be transferred onto one or more corresponding representations of a target character's (e.g., a cartoon character's) face, enabling filmmakers to transfer a performance by a source character to a target character. The source character's 3D facial shape can separated into patches. For each patch, a patch combination (representing that patch as a combination of source reference patches) can be determined. The patch combinations and target reference patches can then be used to create target patches corresponding to the target character. The target patches can be combined using an anatomical local model solver to produce a 3D facial shape corresponding to the target character, effectively transferring a facial performance by the source character to the target character.

22 Claims, 9 Drawing Sheets

(51) Int. Cl.
*G06T 7/10* (2017.01)
*G06T 13/40* (2011.01)

(58) Field of Classification Search
CPC ........ G06T 2207/30201; G06V 20/653; G06V 40/176; G06V 40/165
See application file for complete search history.

(56) References Cited

U.S. PATENT DOCUMENTS

| | | | |
|---|---|---|---|
| 9,342,912 B1 | 5/2016 | Pighin et al. | |
| 9,477,878 B2 | 10/2016 | Beeler et al. | |
| 9,639,737 B2* | 5/2017 | Beeler | G06V 20/653 |
| 9,652,890 B2* | 5/2017 | Beeler | G06T 7/11 |
| 10,269,165 B1 | 4/2019 | Bhat et al. | |
| 11,069,135 B2 | 7/2021 | Grabli et al. | |
| 11,151,767 B1* | 10/2021 | Zoss | G06T 17/00 |
| 2017/0091994 A1* | 3/2017 | Beeler | G06T 7/11 |
| 2021/0158590 A1* | 5/2021 | Bradley | G06T 17/20 |
| 2021/0279956 A1 | 9/2021 | Chandran et al. | |

OTHER PUBLICATIONS

Zollhöfer, M., J. Thies3 P. Garrido, D. Bradley4 T. Beeler4 P. Pérez, M. Stamminger, and M. Nießner3 C. Theobalt. "State of the Art on Monocular 3D Face Reconstruction, Tracking, and Applications." STAR 37, No. 2 (2018).*

Weise, et al., "Realtime Performance-Based Facial Animation", ACM Transactions on Graphics, vol. 30, No. 4, Available online at https://dl.acm.org/doi/pdf/10.1145/2010324.1964972, Jul. 2011, pp. 1-10.

Wu, et al., "An Anatomically-Constrained Local Deformation Model for Monocular Face Capture", ACM Transactions on Graphics, vol. 35, No. 4, Available online at https://dl.acm.org/doi/pdf/10.1145/2897824.2925882, Jul. 2016, 12 pages.

* cited by examiner

FACIAL ANIMATION RETARGETING USING A PATCH BLEND-SHAPE SOLVER

BACKGROUND OF THE INVENTION

In modern filmmaking, performances by actors and actresses (human, animal, or otherwise) are sometimes used to generate animated performances by computer-generated characters. Often, filmmakers want the computer-generated character's performance to closely match the performance of the human actor. For example, if the human actor expresses a particular emotion, such as joy, the filmmaker may want the computer-generated character to express that same emotion. The process of mapping the performance of a source character (e.g., the actor) to a target character (e.g., the computer-generated character) may be referred to as "animation retargeting." The process of specifically mapping a facial performance (e.g., the formation of expressions) from a source character to a target character may be referred to as "facial animation retargeting." Although uncommon, in some cases the source character may not be a living actor or actress, and may also be a computer-generated character.

It can sometimes be difficult to perform facial animation retargeting, particularly when there are large differences between source characters and target characters. A source character can have physical features (such as wrinkles or jowls) that a target character does not possess, and vice versa. These physical features and their movement can inadvertently be transferred during animation retargeting, which can result in a visually-displeasing animated performance by the target character.

There are a few conventional techniques that have been used to order to overcome these difficulties. One conventional method is the use of rigs, particularly facial rigs for facial animation. A rig can comprise an interface that can be used to control how a computer-generated character moves and acts. A filmmaker can build a facial rig for both the source character and the target character, then qualify the source character's performance in terms of rig parameters or changes in rig parameters. The filmmaker can then transfer the rig parameters to the target character, effectively causing the target character to copy the source character's performance. One issue with this rig-based approach is that it can be time consuming, requiring human artists and filmmakers to generate hundreds or thousands of three dimensional (3D) shapes in strict correspondence for both the source character and the target character to obtain an accurate result. Additionally, if the source character is an actor, building the rigs can require a lot of actor scanning, which can be time consuming and unpleasant for actors.

Embodiments address these and other problems with facial animation retargeting individually and collectively.

BRIEF SUMMARY OF THE INVENTION

Embodiments of the present disclosure are directed to methods and systems for performing facial animation retargeting. Embodiments of the present disclosure enable facial animation retargeting to be performed with a high degree of accuracy while requiring less labor by filmmakers and digital artists than some other facial expression transfer techniques. Using embodiments, one or more 3D source facial shapes corresponding to a source character can be retargeted to produce one or more 3D target facial shapes corresponding to a target character.

In broad terms, embodiments of the present disclosure achieve these improvements using segmentation techniques, reference shapes, and anatomical modelling. One or more 3D source facial shapes can be subdivided into source patches. These source facial shapes may have been extracted from one or more frames of animation, or from a video recording of a performance by the source character. For each source patch, a patch combination can be determined. The patch combination can provide a way to represent a source patch as a combination of source reference patches. These source reference patches can correspond to a collection of 3D source facial reference shapes, which can comprise 3D facial shapes of the source character expressing different expressions (e.g., joy, anger, neutral face, mouth open, mouth closed, etc.).

For each 3D source facial reference shape there can be a corresponding 3D target facial reference shape corresponding to the target character. As such, for each source reference patch there can be a corresponding target reference patch and the source reference and target reference patches can use the same patch segmentation. Alternatively, if the source reference and target reference patches are not in correspondence, a mapping between the source reference patches and target reference patches can be specified. Using the plurality of patch combinations and the target reference patches, a plurality of target patches (corresponding to the target character) can be generated.

These target patches can be combined to produce one or more 3D target character facial shapes, effectively completing the facial retargeting process. One technique that can be used to produce the final 3D target character facial shapes from the target patches is the use of an anatomical local model (ALM). ALMs are used in performance capture systems, such as the Anyma Performance Capture system, in order to generate anatomically-constrained 3D facial shapes from inputs such as video of an actor's performance. An ALM accounts for anatomical features, such as bone structure, skin elasticity, etc., and can be used to generate 3D facial shapes that are more realistic or have greater fidelity to their corresponding character. Embodiments can use the target patches (or alternatively, a 3D facial shape generated by "stitching together" the target patches) as an input to an ALM solver, in order to produce an anatomically-constrained target character facial shape.

In more detail, one embodiment is directed to a computer-implemented method of performing facial animation retargeting form a source character to a target character, the method comprising: generating a plurality of source patches corresponding to a three-dimensional (3D) source facial shape and the source character, each source patch of the plurality of source patches comprising geometric elements corresponding to the 3D source facial shape; generating a patch combination for each source patch of the plurality of source patches, thereby generating a plurality of patch combinations, wherein each patch combination is generated using a patch solver and a plurality of source reference patches, the plurality of source reference patches corresponding to a plurality of 3D source facial reference shapes; generating a plurality of target patches using the plurality of patch combinations and a plurality of target reference patches, the plurality of target reference patches corresponding to a plurality of 3D target facial reference shapes and the target character; and generating a 3D target facial shape using an anatomical model solver and the plurality of target patches, wherein the anatomical model solver generates the 3D target facial shape by determining anatomical parameters corresponding to an anatomically-constrained model of the target character, and wherein the anatomically-constrained model comprises a combination of a plurality of local shape subspaces and an anatomical subspace.

Another embodiment is directed to a computer-implemented method of transferring a facial performance from a subject to a computer-generated character, the method comprising: receiving one or more frames representing at least a portion of the facial performance by the subject, wherein each frame of the one or more frames includes a three-dimensional (3D) subject facial shape corresponding to a facial expression of the subject during the facial performance; and for each frame of the one or more frames: removing rigid motion of the 3D subject facial shape; segmenting the 3D subject facial shape into a plurality of subject performance patches with overlapping boundaries using a subject patch layout; for each subject performance patch of the plurality of subject performance patches: representing a deformation of the subject performance patch using a corresponding subject patch model and a non-linear patch solver, wherein the corresponding subject patch model is a subject patch model of a plurality of subject patch models, wherein each subject patch model defines a subject patch as a linear combination of corresponding patches in a plurality of 3D subject facial reference shapes; generating a corresponding character performance patch using the deformation of the subject performance patch and a corresponding character patch model, thereby generating a plurality of character performance patches, wherein the corresponding character patch model is a character patch model of a plurality of character patch models, wherein each character patch model defines a character patch as a linear combination of corresponding patches in a plurality of 3D character facial reference shapes; and generating a 3D character facial shape using the plurality of character performance patches and an anatomically-constrained model of the computer-generated character, thereby generating one or more 3D character facial shapes corresponding to the one or more frames.

Yet another embodiment is directed to a system for performing facial animation retargeting, the system comprising one or more processor and a non-transitory computer readable medium coupled to the one or more processors, the non-transitory computer readable medium comprising code, executable by the processor to cause the system to perform either of the methods described above.

These and other embodiments are described in the detailed description below.

BRIEF DESCRIPTION OF THE DRAWINGS

Illustrative embodiments of the present disclosure are described in detail below with reference to the following drawing figures.

DETAILED DESCRIPTION OF THE INVENTION

Figure 1:
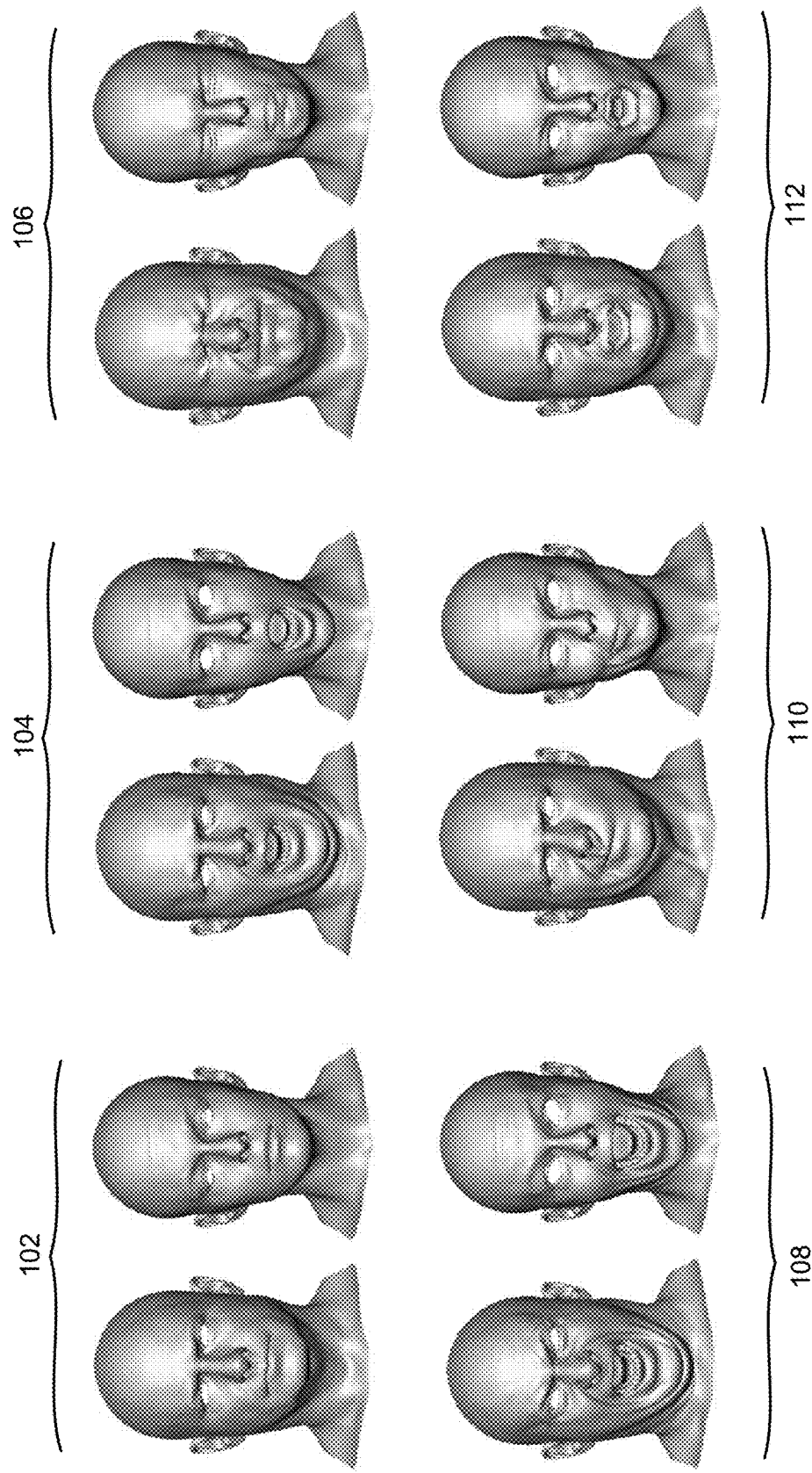
FIG. 1 shows several pairs of exemplary 3D facial reference shapes in correspondence.

In the following description, for the purposes of explanation, specific details are set forth in order to provide a thorough understanding of embodiments of the present disclosure. However, it will be apparent that various embodiments can be practiced without these specific details. The figures and description are not intended to be restrictive.

The ensuing description provides exemplary embodiments only, and is not intended to limit the scope, applicability, or configuration of the disclosure. Rather, the ensuing description of exemplary embodiments will provide those skilled in the art with an enabling description for implementing an exemplary embodiment. It should be understood that various changes can be made in the function and arrangement of elements without departing from the spirit and scope of the present disclosure as set forth in the appended claims.

Prior to describing embodiments of the present disclosure in greater detail, it may be useful to describe some concepts that can be used to implement some methods according to embodiments, as well as some terms that may be used through the disclosure.

I. Concepts

A. 3D Shapes and Geometric Elements

A 3D shape generally refers to a three-dimensional representation of an object, including abstract objects or other objects for which there is no real-world analog. On a computer system, a 3D shape can be stored in a file conforming to a 3D file format, such as an STL, OBJ, FBX, COLLADA, 3DS, etc. file. 3D shapes can be made up of geometric elements, such as vertices, edges, faces, polygons, surfaces, etc.

A 3D shape can comprise a mesh or a polygon mesh. A mesh can comprise a collection of vertices and defined edge connections between those vertices. A mesh topology can describe the connections between vertices and edges in a mesh. It is possible for two different looking meshes to share the same mesh topology. 3D shapes can also be in some form of correspondence. As an example, for each geometric element (such as vertices, polygons, etc.) in one 3D shape, there may exist a corresponding geometric element in another 3D shape. Such a correspondence can also be referred to as a "mapping." In some cases, sharing a mesh topology and being in correspondence may be equivalent. Two 3D shapes can also be in semantic correspondence (i.e., generally depicting the same thing), such as two 3D shapes that both depict different smiling characters.

Geometric elements can have associated position values. These position values can be used to define the position of those geometric elements in a coordinate frame (such as a canonical coordinate frame), relative to other geometric elements in that 3D shape and an origin. In 3D shapes, these position values can comprise ordered tuples of Cartesian coordinates, i.e., (x, y, z). A 3D shape can be centered at an origin, such that either the center of the 3D shape or a defined reference position is located at the origins. 3D shapes can be modified or operated on by operating on the position values associated with geometric elements. For example, a 3D shape can be made larger or smaller (scaling) by multiplying each position value by a scalar quantity. As another example, a 3D shape can be moved (translated) by adding a scalar quantity to each position value. As a third example, a 3D shape can be rotated by multiplying the positional tuples corresponding to the geometric elements by a rotation matrix. Translation and rotation are examples of rigid motion, motion which affects a 3D shape as a whole rather than affecting individual elements.

A deformation generally refers to a transformation of a 3D shape that can be expressed relative to one or more other 3D shapes. For example, if a 3D shape of a person has been modified to lengthen the person's nose, a deformation may comprise the act of lengthening the nose or a measure of the extent to which the nose has been lengthened. If a deformation is local to a particular set of geometric elements (e.g., geometric elements representing a nose), it may be referred to as a local deformation.

B. Characters, Facial Shapes, and Performances

A 3D facial shape can refer to a 3D shape that represents a face. A 3D facial shape can represent the face of a character. A character can refer to a fictional or real character, or even to the entity (e.g., the actor or actress) that portrays that character. A character can be a computer-generated character. In embodiments, the "input" to facial animation retargeting methods can be referred to as a "source character," and the "output" of facial animation retargeting methods can be referred to as a "target character." Expressed in other words, a facial performance by the source character can be retargeted to generate a facial performance by the target character. A source character can also be referred to as a subject. As such, a "3D source facial shape" or a "3D subject facial shape" can refer to a 3D facial shape of the source character or subject. A "3D target facial shape" or a "3D character facial shape" can refer to a 3D shape of the target character or a computer-generated character.

In many applications of embodiments, a source character can be portrayed by a human actor or actress, and a target character can comprise a computer-generated character. However, other combinations of source and target characters are possible, including retargeting from a computer-generated source character to a computer-generated target character. For example, an animated film could have an animated 3D source character. If the character's design tests poorly with audiences, the filmmakers could design a new 3D character and then use retargeting to retarget the performance of the original 3D character to the new 3D target character, in order to change the 3D character without reanimating every one of the character's scenes.

A 3D facial reference shape can refer to a 3D facial shape that depicts a reference expression, such as smiling, yelling, mouth open, mouth closed, resting face, etc. 3D facial reference shapes corresponding to a source character can be referred to as "3D source facial reference shapes." Likewise, 3D facial reference shapes corresponding to a target character can be referred to as "3D target facial reference shapes." 3D source facial reference shapes and 3D target facial reference shapes can be in semantic correspondence. That is, for each 3D source facial reference shape representing the source character making a particular expression, there can be a corresponding 3D target facial reference shape representing the target character making that same expression. FIG. 1 shows 6 exemplary pairs of 3D facial reference shapes in correspondence 102-112. 3D facial reference shapes can be in a canonical coordinate frame and centered at an origin, in order to facilitate any comparisons or operations performed on them. 3D facial shapes can be used or referred to as "blend shapes," "morph targets," or "shape keys" when used during morph target animation or in other similar circumstances.

3D facial shapes (including 3D facial reference shapes) can be acquired or generated through a variety of means. As an example, 3D facial shapes and 3D reference facial shapes of computer-generated characters can be generated by artists through the use of 3D modeling and animation software. 3D facial shapes can also be acquired using facial performance tracking and facial performance capture systems. Such systems can automatically convert one or more video sources (e.g., recorded using video cameras) into sequences of 3D facial shapes. Two examples of such system are the Medusa Facial Capture system and the Anyma Performance Capture system.

Sequences of 3D facial shapes, or of 2D renderings of 3D facial shapes can be referred to as "frames of animation" and when played in sequence, can amount to an "animated performance" or a "facial performance" by the corresponding character. As described further below, facial retargeting can be performed on each frame of animation, in parallel, in order to retarget from a 3D source facial shape contained in that frame of animation to a 3D target facial shape. If facial retargeting is performed on each frame of animation in this way, the result can comprise frames of animation corresponding to a facial performance by the target character that is equivalent or similar to the initial facial performance by the source character.

Figure 2:
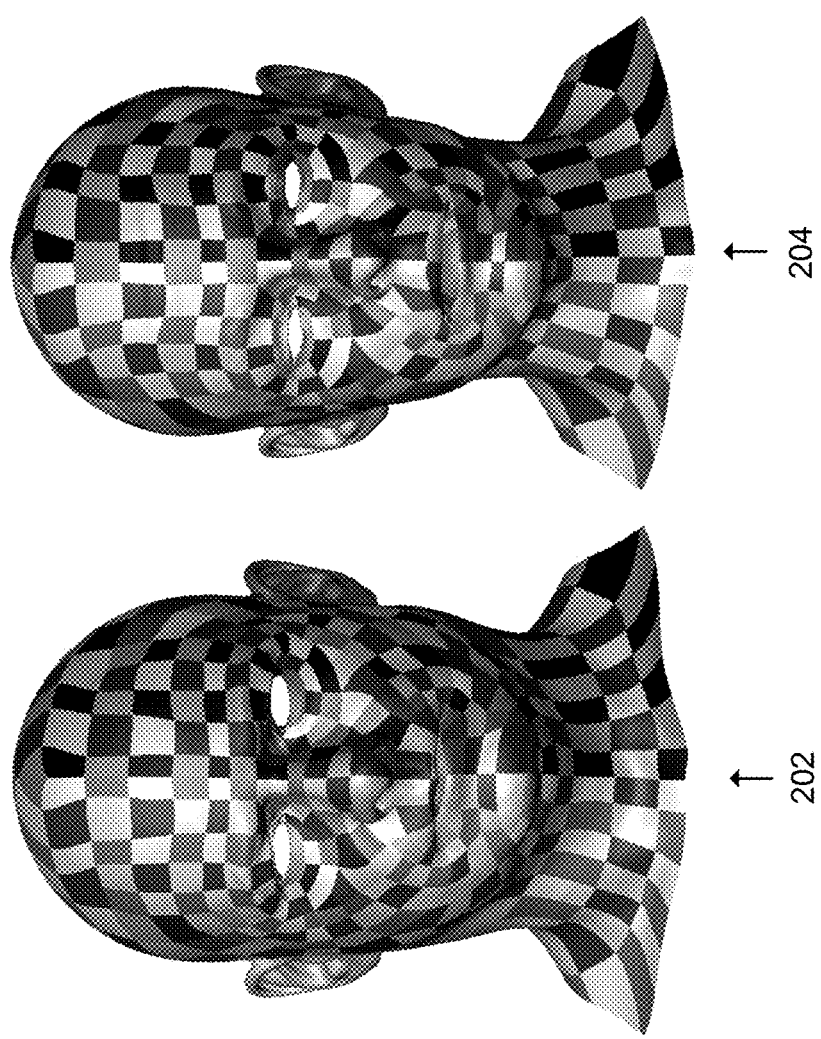
FIG. 2 shows two patch-segmented 3D facial reference shapes in correspondence

C. Patches 3D facial shapes can be decomposed into patches, 3D shapes representing a segment of a 3D facial shape. Likewise, patches can be combined or "stitched together" to build a 3D facial shape. FIG. 2 shows two examples of 3D facial shapes 202 and 204, each of which has been segmented into patches. These patches can have generally consistent sizes and shapes (e.g., four-sided polygonal surfaces). A patch corresponding to a 3D source facial shape can be referred to as a "source patch," or a "subject patch." A patch corresponding to a 3D source facial reference shape can be referred to as a "source reference patch" or a "subject reference patch." Likewise, a patch corresponding to a 3D target facial shape can be referred to as a "target patch" or a "character patch," and a patch corresponding to a 3D target facial reference shape can be referred to as a "target reference patch" or a "character reference patch." A patch corresponding to a 3D facial shape that is part of a performance by a source character (e.g., not a reference patch) can be referred to as a "source performance patch" or a "subject performance patch." A patch corresponding to a 3D facial shape that is part of a (retargeting) performance by a target character can be referred to as a "target performance patch" or a "character performance patch."

Figure 3:
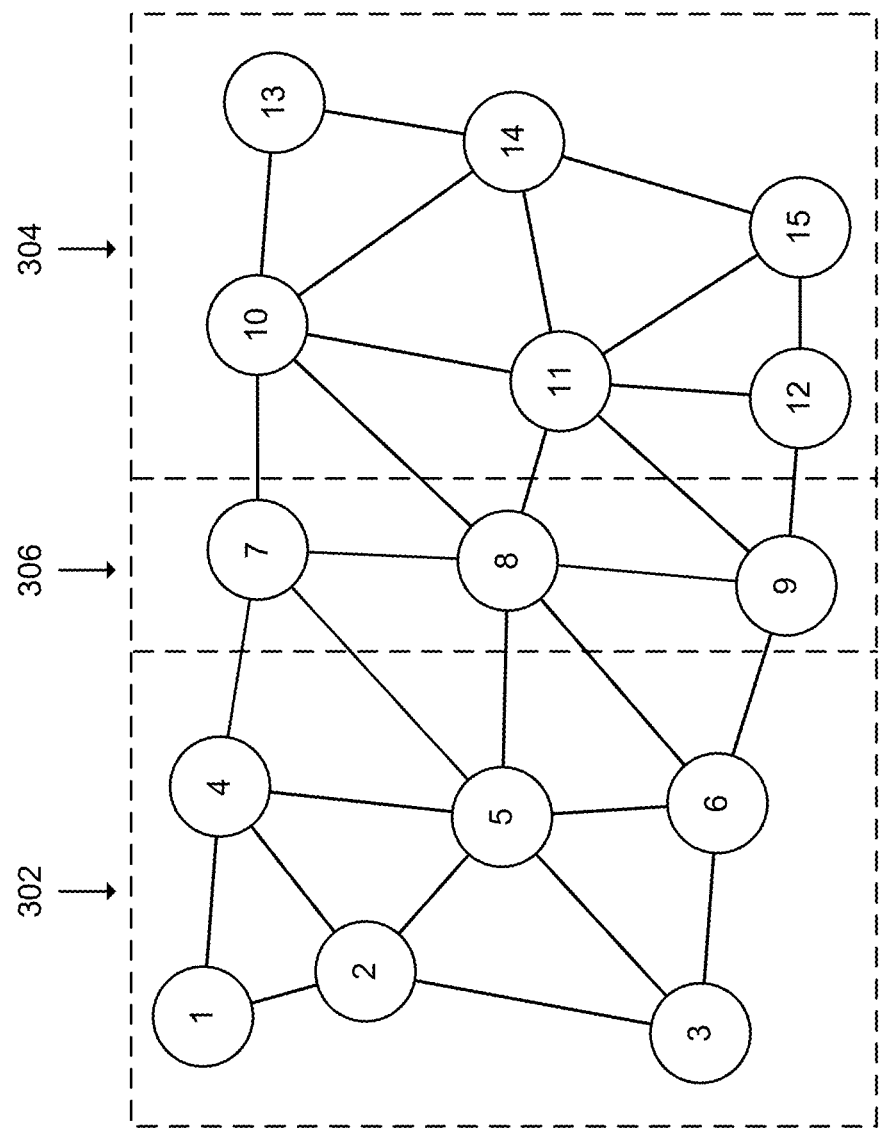
FIG. 3 shows two abstract representations of patches and an overlapping boundary.

Adjacent patches (e.g., source patches, source reference patches, target patches, target reference patches, etc.) can have overlapping boundaries. That is, two adjacent patches can contain the same geometric elements. FIG. 3 shows a close up of two abstract representations of patches 302 and 304 as vertex meshes. Patch 302 comprises vertices 1-9. Patch 304 comprises vertices 7-15. Both patches comprise vertices 7-9, which comprise the overlapping boundary 306. The use of overlapping boundaries can be advantages, as it can reduce or eliminate the effects of visual artifacts (such as tearing) that can occur during facial animation retargeting.

A "patch layout" may refer to something that defines the segmentation of a 3D facial shape into patches. Such a patch layout can be designed by hand, using a computer, or automated via a segmentation algorithm. A "UV layout" may refer to a mapping of a 3D shape to a 2D domain or a 2D plane. A UV layout is commonly used to texture 3D shapes as painting in a 2D domain is easier and more intuitive. UV layouts can be obtained automatically by existing algorithms or can be careful created by a human artist. UV layouts, used to perform UV mapping during 3D modeling, can be used as patch layouts or to generate patch layouts. A patch layout corresponding to a source character can be referred to as a "source patch layout" or a "subject patch layout." A patch layout corresponding to a target character can be referred to as a "target patch layout" or a "character patch layout." 3D facial shapes corresponding to the same character can have the same patch layout, e.g., there can be a single source patch layout for all 3D source facial shapes and 3D source facial reference shapes. Likewise, there can be a single target patch layout for all 3D target facial shapes and 3D target facial reference shapes. In some instances, the source character and the target character can have the same patch layout, and thus there can be a single patch layout for all 3D facial shapes.

Much like how 3D facial shapes can be in correspondence with other 3D facial shapes, patches can be in correspondence with other patches. For example, for each patch in a 3D source facial shape, there may be a corresponding patch in a plurality of 3D source facial reference shapes. Likewise, for each patch in a 3D target facial shape, there may be a corresponding patch in a plurality of 3D target facial reference shapes. Source patches and target patches may also be in correspondence, such that for each source patch in a 3D source facial shape there exists a target patch in a 3D target facial shape.

D. Patch Operations and Analysis

Patches are 3D shapes and comprise geometric elements. As such, it is possible for patches to be the subject of mathematical operations. As an example, a patch can be scaled, translated, or rotated by performing operations on the geometric elements that make up the patch. Likewise, a "patch deformation" can define a transformation or other modification to a patch in terms of other patches, much like how a deformation generally refers to a transformation of a 3D shape in terms of other 3D shapes.

It is possible to define or create other patch arithmetic operations by operating on the geometric elements that make up those patches. For example, a patch $p_1$ and a patch $p_2$ can be summed together to create a third patch $p_3$. This could be accomplished by adding together position values corresponding to geometric elements in each of the patches. To illustrate, exemplary patches $p_1$ and $p_2$ each comprise three vertices in correspondence (i.e., $p_1=\{v_{1,1}, v_{1,2}, v_{1,3}\}$, and $p_2=\{v_{2,4}, v_{2,2}, v_{2,3}\}$, and each vertex may be defined by a set of Cartesian coordinates corresponding to the location of that vertex (i.e., $v_{1,1}=(x_{1,1}, y_{1,1}, z_{1,1})$). As such, each patch can be represented by these Cartesian coordinates (e.g., $p_1=\{(x_{1,1}, y_{1,1}, z_{1,1}), (x_{1,2}, y_{1,2}, z_{1,2}), (x_{1,3}, y_{1,3}, z_{1,3})\}$). These patches $p_1$ and $p_2$ can be added together by adding corresponding Cartesian coordinate values together. For example, if patches $p_1=\{(0, 0, 0), (3, 0, 0), (3, 4, 0)\}$ and $p_2=\{(0, 0, 2), (5, 0, 2), (5, 6, 2)\}$, then $p_4+p_2=p_3=\{(0, 0, 2), (8, 0, 2), (8, 10, 2)\}$. Similarly, patch $p_1$ and patch $p_2$ can be subtracted to produce a patch $p_4$: $p_1-p_2=p_4=\{(0, 0, -2), (-2, 0, -2), (-2, -2, -2)\}$.

1. Patch Combinations

The concepts of patch addition and patch scaling can be used in order to define "patch combinations," including linear combinations of patches. In embodiments, a patch combination can be used to define a patch as a combination of corresponding reference patches. As described in more detail below, for each patch corresponding to a 3D source facial shape (corresponding to a facial performance by a source character), a patch combination can be determined that relates that source patch to a plurality of source reference patches. These patch combinations can be used with a plurality of target reference patches to generate a plurality of target patches corresponding to the target character, effectively transferring or retargeting a facial performance by the source character to the target character.

A patch combination can comprise formula, a function, code, or data that can be used to define a combination of patches. There are a variety of ways in which a patch combination could be defined. As an example, a patch combination could comprise a series or sequence of alphanumeric characters, such as [1, 121, 10, 0.6, 121, 12, 0.4], that can be interpreted in order to carry out a combination of patches. The sequence [1, 121, 10, 0.6, 121, 12, 0.4] could correspond to combination instructions such as "For character 1, take patch #121 of patch-segmented 3D facial reference shape #10 ($p_{121,10}$) and scale it by 0.6, then take patch #121 of patch-segmented 3D facial reference shape #12 ($p_{121,12}$) and scale it by 0.4, then calculate the sum of the two patches (i.e., $0.6*p_{121,10}+0.4*p_{121,12}$). The scaling factors 0.6 and 0.4 can be referred to as "weights" or "blend weights."

A practitioner of methods according to embodiments could interpret this patch combination and carry out the corresponding instructions, or use the patch combination as an input to computer software to automatically carry out the instructions. It should be understood that the exemplary patch combination described above has been intentionally simplified for the purpose of illustration, and is not intended to be limiting. In many practical implementations, a patch combination may include more data than what has been described, including, e.g., resource locators that identify the locations of patch-segmented 3D facial reference shapes, data identifying the total number of 3D facial reference shapes, data identifying the number of patches in each 3D facial reference shapes, file metadata such as a file size, a file header, etc.

A "patch model" may refer to a defined relationship between patches that can be used to determine a patch combination. As an example, a patch model can identify reference patches that can be used to construct a particular patch. A patch model need not necessarily include the blend weights associated with each reference patch. Such blend weights can be determined using a patch-solver, as described in the following section.

2. Patch Difference Analysis

Patch subtraction and other forms of geometric or mathematical analysis can be used in order to analyze or compare patches. Such analysis can result in "difference metrics" or "error metrics," quantities that describe a difference between two patches. One example of an error metric is a vector of the Euclidean distances between corresponding vertices in two patches. Using the exemplary patches $p_1=\{(0, 0, 0), (3, 0, 0), (3, 4, 0)\}$ and $p_2=\{(0, 0, 2), (5, 0, 2), (5, 6, 2)\}$ defined above, the difference between these patches is $p_4=\{(0, 0,$ −2), (−2, 0, −2), (−2, −2, −2)}. From this difference, three Euclidean distances (corresponding to each vertex) can be defined using the formula $\sqrt{x^2+y^2+z^2}$, i.e., $d_4=\{2, 2\sqrt{2}, 2\sqrt{3}\}$. The vector $d_4$ alone could be used as an error metric, or could be used to further construct an error metric. For example, the average of the three Euclidean distances (approximately 2.76) or the sum of the three Euclidean distances (approximately 8.29) could be used as an error metric. Other examples of error metrics include the root mean square deviation, the residual sum of squares, etc. There are a variety of statistics that can be constructed in order to quantify the difference between two patches. The examples provided above are intended to be illustrative and non-limiting.

Such error metrics can be the product of an "error function" or "loss function," a function that takes in some inputs (such as patches, geometric elements corresponding to patches, position values corresponding to geometric elements, etc.) and produces the error metric corresponding to the difference between those inputs. Such error functions can form the basis of a "solver," a tool, function, or heuristic that can be used to solve problems, particularly problems for which no exact solution exists. Many solvers operate by minimizing the error function, e.g., determining a set of inputs parameters that produce the minimum error metric, or produce an error metric that is less than an "error metric threshold." For example, a solver can attempt to determine a solution until it identifies a solution that is 99% accurate, that is, the error metric is 1% of the solution value. In this case, the value "1%" can comprise the error metric threshold.

There are a large variety of techniques that can be used to implement a solver using error function minimization with varying degrees of efficiency and complexity. Embodiments of the present disclosure are not limited to any particular solver algorithm or heuristic. As such, the examples provided are not intended to be limiting. One example of a (typically ineffective) solver is a random solver. The random solver can generate solution parameters at random, then evaluate the error metrics corresponding to those parameters, and select a solution comprising the solution parameters corresponding to the minimum error metric, or solution parameters corresponding to an error metric that is less than an error metric threshold. Another example is the use of differential analysis. For some error functions, a closed-form of the derivative can be determined. The solver can evaluate that derivative to identify states where the derivative equal zero, corresponding to either local minima or maxima in the error function. The solver can evaluate some or all of these local minima and maxima, and identify either the global minima or a minima that corresponds to an error metric less than an error threshold. Other techniques, such as minimizing an energy function using the Gauss-Newton method, simulated annealing, interacting Metropolis-Hastings algorithms, genetic algorithms, etc., can be used to implement a solver.

As an example, a "patch solver" can be used to determine a patch combination that defines a particular source patch as a combination of source reference patches. As another example, in some implementations, a patch solver can also output a rigid transformation (a 3D rotation and a translation) that can compensate for the differences in the alignment of the source and target reference shapes at the origin. This rigid transformation can be determined by the patch solver simultaneously with the patch combinations. A patch solver can be non-linear. For an input source patch, the patch solver can generate one or more "candidate patch combinations" and use those candidate patch combinations and target reference patches to generate one or more "candidate source patches." Each candidate source patch can be compared to the source patch using the patch difference analysis techniques described above. For example, the patch solver can calculate the Euclidean distances between source vertices (corresponding to an input source patch) and candidate vertices (corresponding to the one or more candidate patches. These Euclidean distances or L2 Euclidean norms can be used as error metrics, or used to calculate error metrics using the techniques described above (e.g., calculating root mean square deviation, etc.).

After calculating error metrics corresponding to the candidate source patches, the patch solver can then select a solution patch combination based on these error metrics. As one example, the patch solver can select the patch combination corresponding to the candidate source patch with the minimum corresponding error metric, or the patch solver can select a patch combination corresponding to a candidate source patch with an error metric less than an error metric threshold. In this way, a patch solver can determine a patch combination that is a close match for a source patch corresponding to a facial performance.

A patch solver can also include one or more "regularizers" or "regularizer terms." These regularizers can influence the error function and error metrics and enable better control over the solutions produced by the patch solver. An example of a regularizer is a "blend weight regularizer." A blend weight regularizer can cause error metrics to increase in value as the blend weights (e.g., the scaling factors) associated with a candidate patch combination increase, and can similarly cause error metrics to decrease in value as the blend weights associated with a candidate patch combination decreases. In this way, a blend weight regularizer can promote solutions (patch combinations) for which the blend weights are small, and penalize solutions for which the blend weights are large. A second example of a regularizer is an "adjacency regularizer." An adjacency regularizer can cause error metrics to increase in value as a candidate patch becomes less alike adjacent patches, and likewise can cause error metrics to decrease in value as a candidate patch becomes more alike adjacent candidate patches. In this way, an adjacency regularizer can promote solutions that are similar to adjacent patches, and penalize solutions that are different from adjacent patches.

The use of regularizers is largely at the discretion of practitioners of methods according to embodiments. Regularizers can be used to reduce or eliminate visual artifacts that may appear during facial retargeting or to encourage the patch solver to prefer certain patch combinations that are preferred by artists. A blend weight regularizer, for example, can prevent the generation of patches that are "extreme" patch combinations of their corresponding source reference patches. Such patches may have a low corresponding error metric because they are a local minima of the error function, but may produce a strange or distorted 3D facial shape. An adjacency regularizer can prevent visual artifacts from appearing at the boundaries between patches, particularly due to adjacent patches that have divergent patch combinations. A preferred shape regularizer, for example, can give a higher importance to some patch combinations that artists might prefer to see in the result.

In embodiments, for a patch-segmented 3D source facial shape (e.g., corresponding to a frame of a facial performance), a patch solver can be used to determine a source patch combination for each source patch in the patch-segmented 3D source facial shape. These source patch combinations can be used to generate target patches corresponding to the target character, using techniques described below.

E. Retargeting Using Patch Combinations

Once a patch combination has been determined for a particular source patch, that patch combination can be used to determine a target patch that corresponds to that source patch. As described above, a patch combination effectively defines a combination of reference patches, or comprises instructions that can be used to create that combination. As described above, the exemplary patch combination [1, 121, 10, 0.6, 121, 12, 0.4] could correspond to combination instructions such as "For character 1, take patch #121 of patch-segmented 3D facial reference shape #10 ($p_{121,10}$) and scale it by 0.6, then take patch #121 of patch-segmented 3D facial reference shape #12 ($p_{121,12}$) and scale it by 0.4, then calculate the sum of the two patches (i.e., $0.6*p_{121,10}+ 0.4*p_{121,12}$).

Provided that two characters, their corresponding 3D facial reference shapes, and their patch layouts are in correspondence, a patch combination corresponding to one character can be applied to another character. To apply the above exemplary patch combination to "character 2" (e.g., a target character), the first number could be changed to 2, i.e., [2, 121, 10, 0.6, 121, 12, 0.4], effectively changing the instructions to "For character 2, take patch #121 of patch-segmented 3D target facial reference shape #10 and scale it by 0.6, then take patch #121 of patch-segmented 3D target facial reference shape #12 and scale it by 0.4, then calculate the sum of the two patches."

In this way, or in a similar way, a plurality of source patch combinations, corresponding to a 3D source facial shape, can be used along with a plurality of 3D target facial reference shapes to generate a plurality of target patches that collectively make up a 3D target facial shape, effectively retargeting the 3D source facial shape to the 3D target facial shape. An artist can also manually edit the patch combination or blend weights (e.g., re-weight the belndweights) to either exaggerate/make subtle/modify the effective deformation that is transferred to the target subject F. Anatomical Local Modeling Some methods according to embodiments can use a technique known as anatomical local modelling in order to produce 3D target facial reference shapes. In order to better explain embodiments of the present disclosure, methods of anatomical local modelling are summarized briefly below. More specific detail on anatomical local modeling can be found in U.S. Patent Publication No. US-2017-0091994-A1, titled "Methods and Systems of Generating an Anatomically-Constrained Local Model for Performance Capture," which is incorporated herein in its entirety for all purposes. Some specific details about anatomical local modelling (including specific mathematical formulas) were intentionally left out of this description, and can be found in the abovementioned patent publication. The terms "anatomical local model," "anatomically-constrained model," and "anatomically-constrained local model" are used interchangeably.

A facial expression is generally constrained by anatomical features of the individual making that facial expression, including physical properties of the skin (e.g., elasticity) and the position of facial bones (e.g., the skull, the jaw bone, etc.). For example, an individual can't usually open their mouth beyond the limit imposed by their jaw, and the skin on an individual's face usually will bunch or stretch based on nearby bone structure. An anatomical local model parameterizes these anatomical constraints for a particular subject or character. Later, an anatomical local model solver can be used to solve for these parameters for a particular input. This input could comprise, for example, video of a subject, a 3D facial shape, a plurality of facial patches, etc. The result can comprise an anatomically-constrained 3D facial shape, a 3D facial shape corresponding to the anatomical parameters determined by the anatomical local model solver.

In some embodiments, an anatomical local model can be defined for the target character. An anatomical local model solver can be used to convert a plurality of target character patches, or alternatively a "stitched" 3D target facial shape generated from the target character patches, into an anatomically-constrained 3D target facial shape, completing the retargeting process. There are several advantages to this approach. As one example, an anatomical local model solver can help remove anatomically-inconsistent errors that may be introduced during the patch-based retargeting process. As another example, a production may use anatomical local models for some or all of their characters, and it may be preferable for retargeted facial shapes to adhere to an anatomical local model for consistency or in order to facilitate efficient production.

An anatomical local model can comprise a local shape subspace and an anatomical subspace. The local shape subspace can model and constrain local deformations of different anatomical patches located on or associated with a 3D facial shape. The anatomical subspace can include an anatomical bone structure or other rigid structure that may not include actual bones (e.g., a frame used to support a non-rigid or soft substance or tissue). This can include a computer-generated skull and/or jawbone that is specific to the 3D character associated with the anatomical local model. The anatomical subspace can be used to constrain movement and deformation of the patches. As an example, the anatomical subspace can constrain the patches by considering the varying skin (or other soft or non-rigid tissue) thickness between the patches and the bones (or other rigid structural components.

It may be possible to use the same patch layout for both patch-based retargeting and generating an anatomical local model. However, anatomical local modeling typically benefits from a higher number of patches than the patch-based facial retargeting methods described herein. For example, while 3D facial shapes may be segmented into e.g., between 50 and 250 patches, anatomically-constrained models may be segmented into e.g., 500 to 2000 patches. As described in U.S. Patent Publication No. US-2017-0091994-A1, approximately 1000 patches may be preferable, as during experimental trials the minimum Procrustes error was achieved with this number of patches, and thus approximately 1000 patches may achieve a better anatomically-constrained model fit. As such, it may be preferable to use two distinct patch layouts, one comprising between 50 and 250 patches for patch-based facial retargeting, and one comprising approximately 1000 patches for anatomical local modelling.

Figure 4A:
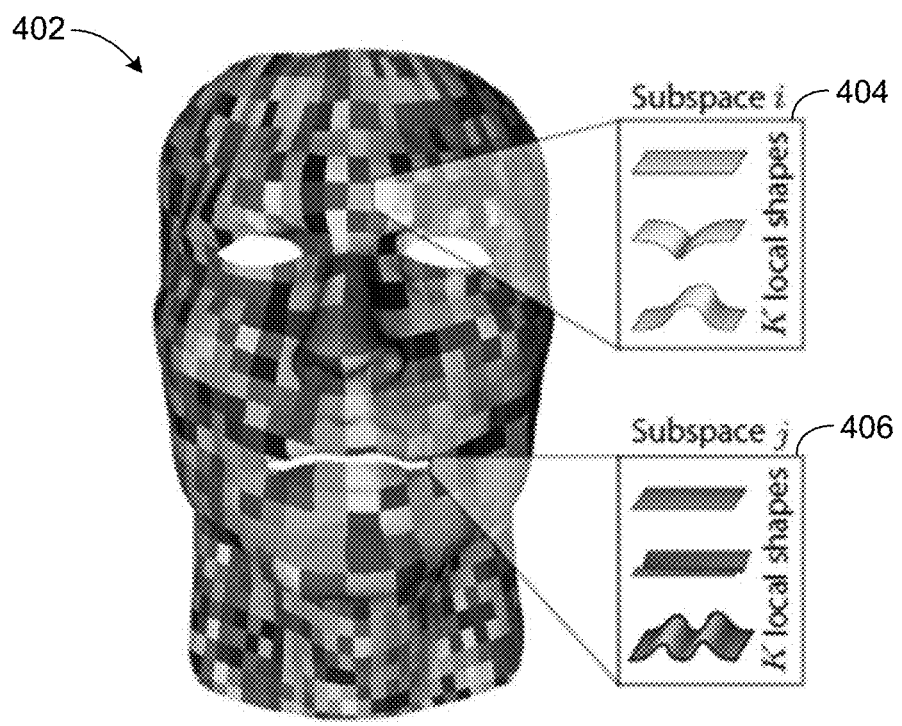
FIGS. 4A and 4B shows an example of an anatomically-constrained local face model, in accordance with some embodiments.

FIG. 4A illustrates an example of a computer-generated representation of a target character's face 400 segmented into multiple patches. In some cases, one or more of the patches may not be overlapping. The local deformation of each patch is constrained by a local shape subspace for each patch. The local shape subspace is learned from a set of training shapes, and the global motion of each patch is defined by a rigid transformation. These set of training shapes could comprise, for example, 3D target facial reference shapes. For each patch i, parameters are defined including the rigid transformation denoted as a matrix and the local shape subspace coefficients $\alpha_i$.

The anatomical subspace component can be modeled as a target character-specific skull and jaw bone. One of ordinary skill in the art will appreciate that other bones in the face may also be used in the anatomical subspace. In one example, a generic skull can be fit to the target character, and the jaw can be modeled by a computer program or an artist. For example, a retargeting computer can obtain or access a generic skull mesh, identify a few key points on the skull, mark corresponding points on the 3D target facial shape with specified skin or other tissue thicknesses, and then deform the skull mesh using any suitable mesh deformation technique (e.g., a Laplacian Deformation) so that the key points correspond with the specified skin or tissue thickness, and so that the skull does not penetrate through the 3D target facial shape at any location.

Figure 4B:
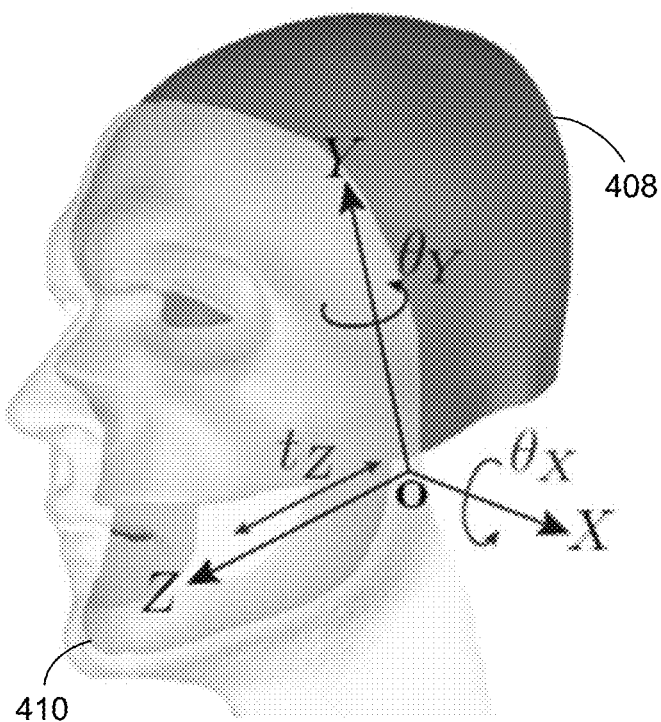

FIG. 4B illustrates an example of a computer-generated representation of an anatomical bone structure of a target character's face, including a skull 408 and a jawbone 410. The skull motion is defined by a rigid transformation matrix $M_s$. The jaw motion is linked to the skull 408 via a pivot point, o, represented as a joint with two degrees of freedom for rotation θ and one degree of freedom for translation t. The jaw motion is denoted as a jaw motion parameter $\Theta = \{\theta_X, \theta_Y, t_Z\}$. The global rigid motion $M_j$ of the jaw can be computed as $M_s \cdot M(\Theta)$, where $M(\cdot)$ computes the transformation matrix corresponding to Θ.

1. Anatomical Patch Segmentation

An anatomical local model can be segmented into patches using similar techniques to those described above with reference to 3D facial shapes. In some embodiments, the patch segmentation can be semantically meaningful, exploiting the physical properties and motion of the skin (e.g. following flow lines on the face). In some embodiments, the patches can be defined using a uniform segmentation across the face. For example, a uniform segmentation in the UV space of the face can be used to define the patches. One of ordinary skill in the art will appreciate that any other patch segmentation can be used.

Because the deformation of each patch is also influenced by neighboring patches, the segmented patches are defined to overlap with their neighbors. The overlapping of the patches can be achieved by first performing a non-overlapping segmentation (as shown in FIG. 4A) and then dilating each patch by a fixed amount (e.g., 5%, 10%, 15%, 20%, or any other suitable amount in each direction). To account for holes or concave boundaries in the UV plane, patches can be split if they contain disconnected regions, ensuring that each patch is a single connected region. The number N of patches to create (or equivalently the patch size) can be a user-defined parameter or an auto-generated parameter.

Once the target character's face is segmented into anatomical patch, a local shape subspace (also referred to as the local skin deformation subspace) can be determined for each anatomical patch. For example, a retargeting computer can determine a local shape subspace 404 for patch i, a local shape subspace 406 for patch j, and a local shape subspace for any other patch on the target character's face. To obtain the local skin deformation subspace, the target character-specific deformation is captured for each patch in correspondence. In one example of capturing a sub-specific deformation for each patch, A neutral 3D target facial reference shape and a set of K 3D target facial reference shapes can be used. For example, given several 3D facial reference shapes in correspondence, the neutral 3D target facial shape is segmented into N patches, as described above. A K+1 reference shape subspace (corresponding to the K 3D target facial reference shapes and the neutral 3D target facial reference shape) is then built for each anatomical patch, by first aligning the K patches to the corresponding neutral patch using Procrustes alignment. One of ordinary skill in the art will appreciate that any alignment technique may be used to minimize the center of mass of the patches being aligned. The neutral patches can be subtracted from the aligned patches to obtain a deformation shape (or component) for each expression. The deformation component represents the difference between a deformed patch from one of the K 3D target facial reference shapes and a corresponding neutral patch from the neutral 3D target facial reference shape. By subtracting out the neutral patches, any rigid motion is removed and the non-rigid deformation of the patches remains. The resulting subspace for a patch i, for example, includes the neutral shape $U_i$ and K deformation components $\{D_i^1, \ldots, D_i^K\}$. A deformation component may also be referred to herein as a deformation shape. Much like the retargeting patches described above, an anatomical patch can then be reconstructed as a linear combination of the deformation components.

The number and description of the K 3D target facial reference shapes used to build an local shape subspace can be adjusted to achieve different results. In some embodiments, all or some of the plurality of 3D target facial reference shapes can be used to build the local shape subspace. One advantage of anatomical local models is that they need far fewer training expressions than typical global models to achieve the same level of performance.

2. Tissue and Bone Modeling

Including an anatomical subspace with the local shape subspace can add robustness to the local face model. Considering the specific anatomical structure of a face, the anatomical skull and jawbone can be used to constrain the anatomical patches globally on the face so that deformation of the patches is jointly-constrained (using the local shape subspace and anatomical constraints) to be physically feasible. The anatomical bone structure is shown in FIG. 4B, and the motion is described by the rigid motion of the underlying bones, which is denoted herein as $M_b$, to mean either $M_s$ when referring to the skull or $M_j$ when referring to the jaw.

To employ the anatomical structure to constrain the patch motion, a link is established between the skin surface and the anatomical bones. The two parts are linked by modeling the behavior of the underlying soft tissue in-between the skin surface and the bones. As skin compresses, it will bulge out away from the bone to preserve the volume of the underlying tissue, increasing the distance between the skin surface and the bone. Similarly, as skin stretches, the skin will move closer to the bone to preserve the volume, decreasing the distance between the skin surface and the bone.

Tissue volume preservation is incorporated into the local subspace face model for patches, with the goal of predicting how a patch moves relative to the bone given a current local deformation of the patch. To incorporate volume preservation of the tissue, the local subspace of the model is expanded beyond a shape basis to also include the skin and underlying tissue thickness for each subspace shape of each patch. While a bone structure is used herein as an example, one of ordinary skill in the art will appreciate the techniques disclosed herein apply to other rigid structures of a target character that may be used, such as an artificial structure of a non-human or fictional target character being modeled that may not include actual bones. Furthermore, while the term skin is used herein as an example, one of ordinary skill in the art will appreciate the techniques disclosed herein apply to other surfaces of a subject that may be used, such as an artificial surface of a non-human or fictional target character being modeled that may not include actual skin.

The thickness of the skin tissue (or other non-rigid or soft tissue) is expressed within the patch as a single value $d_v$ at a vertex v close to the center of the patch. Selecting an actual vertex as a reference point instead of the patch centroid can be advantageous due to the position $x_v$ of the vertex lying on the surface. Computation of the skin thickness for the subspace is not trivial. For example, as a patch deforms, it typically slides over the bone, and thus shape-specific projections from the patch to the bone are accounted for in order to compute the distance from the skin to the bone. Furthermore, when the patch deforms, the normal at v typically changes and is thus not a temporally stable direction to compute the distance along. Since the skull and jaw are relatively smooth and consistently rigid, one approach is to use the inverse of the bone normal to compute the projection or distance. However, in some cases, this approach can introduce a problem since the bone point that corresponds to v may not be known before projecting.

Figure 5A:
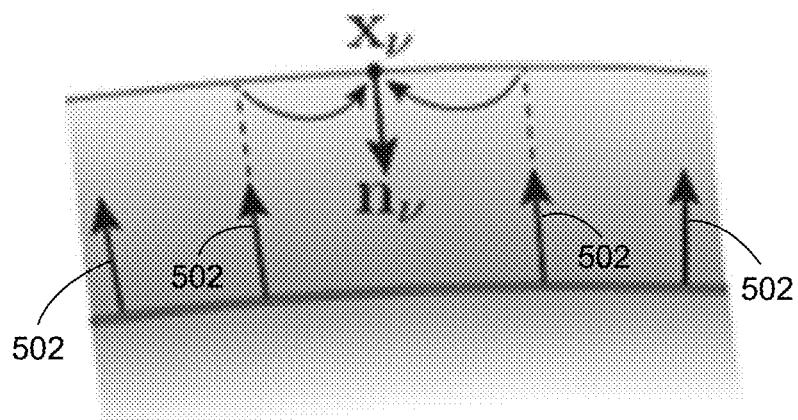
FIGS. 5A-5C shows an example computation of an anatomical subspace of an anatomically-constrained local face model, in accordance with some embodiments.
Figure 5B:
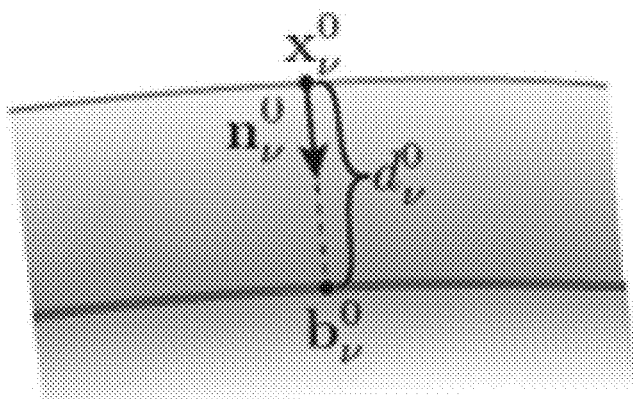
Figure 5C:
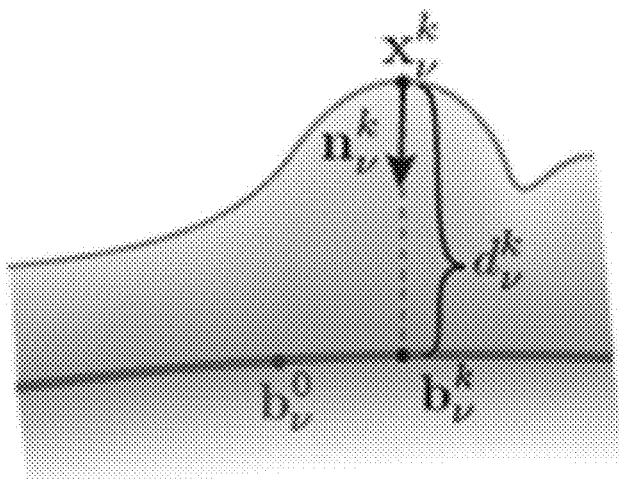

FIG. 5A-FIG. 5C illustrate a technique for computing the skin thickness for the anatomical subspace. As illustrated in FIG. 5A, a point $x_v$ at the center of a patch is related to the underlying bone through a skin thickness constraint $d_v^k$ for each shape of the subspace. The direction $n_v$ in which to measure the thickness is computed by interpolating back-projected normals 502 from bone to skin. For example, the normals 502 are projected backwards from all the vertices of the bone to the patch. The inverse bone normals at the vertex v are then interpolated. For example, linear interpolation can be performed using the defined nearby normals 502. One of ordinary skill in the art will appreciate that any other interpolation, estimation, or combining technique may be used to determine the inverse bone normal using the nearby normal 502. The interpolated normal $n_v$ provides the direction to cast a ray that intersects with the bone at a point denoted by $b_v$, yielding the skin thickness $d_v = \|b_v - x_v\|$. As shown in FIG. 5B, a ray is projected from the position of the vertex $x_v^0$ in the direction of the interpolated normal $n_v^0$, and intersects the bone at the point $b_v^0$ to give the skin thickness distance $d_v^0$. As shown in FIG. 5C, the technique is repeated for all shapes in the subspace to compute skin thicknesses $d_v^k$ for the patch.

To compute an estimate $\tilde{x}_v$ of the vertex position of a patch later on during reconstruction, bone points $b_v^k$ and normal directions $n_v^k$ are additionally stored for each shape k in the local subspace for the patch. These quantities are represented in the coordinate frame $M_b^k$ of the underlying bone, which removes any rigid motion and renders the quantities of the bone points and normal directions compatible. Some patches (e.g., patches on the cheek or other area of the face), do not have an underlying bone and are thus not anatomically constrained.

The local shape subspace and the anatomical subspace can be combined into a common dataset. The combination of local shape subspace plus the anatomical subspace makes up the local face model. In some embodiments, the local shape subspace and the anatomical subspace are kept as separate data sets that can be used together for facial retargeting.

3. Using an Anatomical Local Model Solver

Once an anatomical local model has been determined for the target character, the anatomical local model can be used as part of an anatomical local model solver in order to identify or fit anatomical parameters to a 3D target facial shape or a plurality of target patches. Such an anatomical local model solver can estimate the anatomical local model parameters that best describe the observed motion or deformation under the given constraints through optimization. A retargeting computer can determine the parameters of the anatomical local model that are faithful to the local shape subspaces of the patches and also faithful to any motion data that is observed at a given point in time. Unknowns to solve for include (a) the rigid local patch motion $\{M_i\}$, (b) the local patch deformation, including the local blend coefficients $\{\alpha_i\}$; and c) the rigid motion of the anatomical bones, including skull motion $M_s$ and jaw motion $\Theta$. The solution can be formulated as an energy minimization problem for each 3D target facial shape or each set of 3D target patches.

The energy function E(t) is defined as a least squares problem, which can be solved by a Gauss-Newton solver using a Gauss-Newton method. Due to the rotational components in $\{M_i\}$, $M_s$ and $\Theta$, the energy is non-linear. Therefore, the energy is linearized using a Taylor expansion and the analytical gradient is explicitly computed for each term. The Jacobian matrix is then computed for the normal equations in the Gauss-Newton solver. The rigid transformations can be represented as exponential maps, which work well for rigid tracking. As each patch is related only to its neighbors, the Jacobian matrix is very sparse. An Intel MKL library can be used to solve the sparse matrix to obtain a vector to update the current solution, which is iterated for $N_{iter}$ iterations. After solving for the anatomical parameters, the resulting anatomical patches can be combined into a 3D facial reference shape, with little or no discontinuities between patches.

II. Methods

Methods according to embodiments are described in this section with reference to some figures. The term "practitioner" may be used to refer to an entity performing methods according to embodiments. In many practical applications of embodiments, due to their sometimes computationally-intensive nature, these methods may be carried out by a computer system (e.g., a device or system comprising one or more processors and a non-transitory computer readable medium coupled to the one or more processors). Such a computer system can be referred to as a "retargeting computer." Thus the term "practitioner" may refer to a retargeting computer. An exemplary computer system is described in further detail in Section III below.

Figure 6:
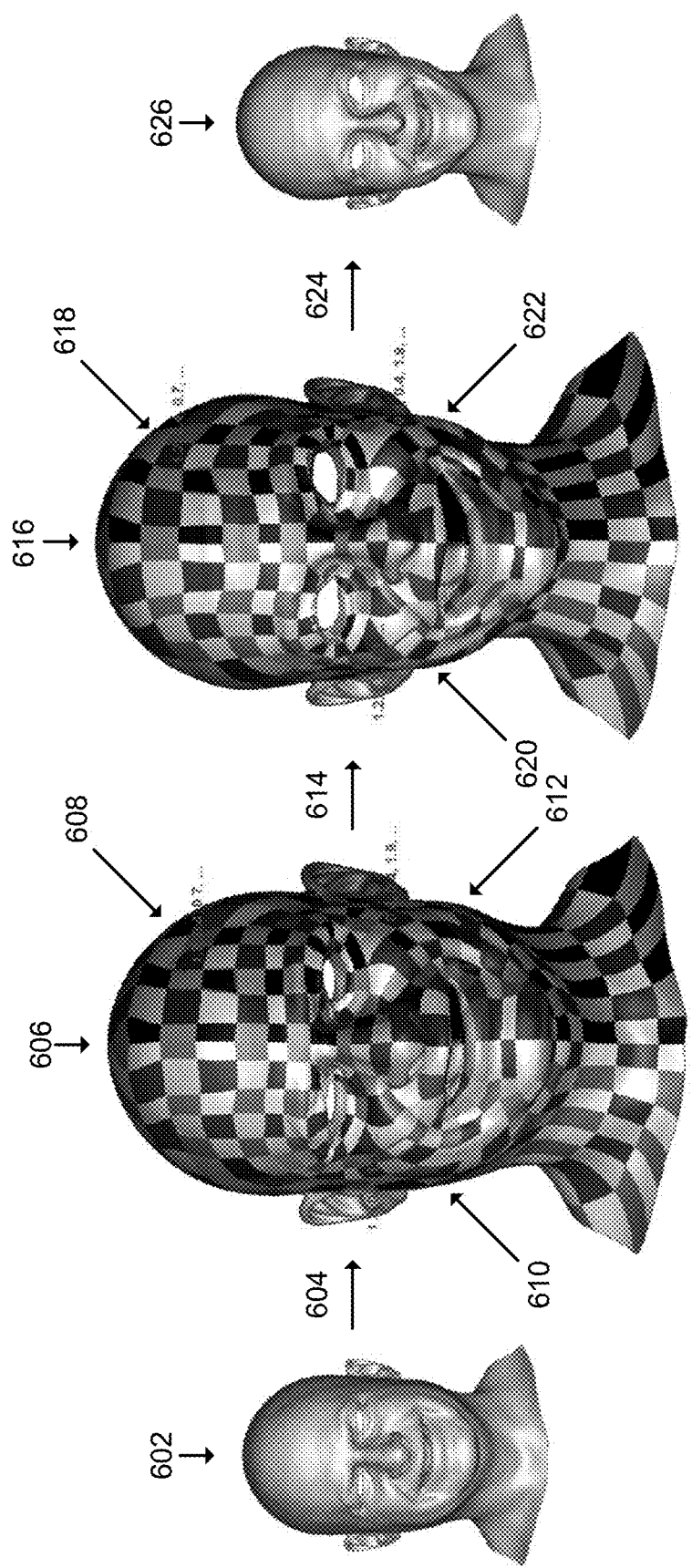
FIG. 6 shows a diagram summarizing a patch-based facial retargeting method according to some embodiments.

Methods of facial retargeting are summarized with reference to FIG. 6. The input to the facial retargeting process, a 3D source facial shape 602 is patch-segmented at step 604 into a plurality of source patches 606. Three source patches 608-612 are specifically indicated. For each source patch, a patch combination can be determined, indicated by the sequences of numbers next to source patches 608-612 (i.e., [1.2, 0.19, 1.3, . . . ], [1.2, 0.4, 0.7, . . . ], and [0.4, 0.4, 1.9, . . . ]). At step 614, these patch combinations can be used to generate target patches 616 corresponding to a target character. Specifically indicated are three target patches 618-622. Notably these three target patches have the same patch combinations as their corresponding source patches 608-612. At step 624, the target patches can be combined (using, e.g., an anatomical local model solver) to generate a 3D target facial shape 626.

Figure 7:
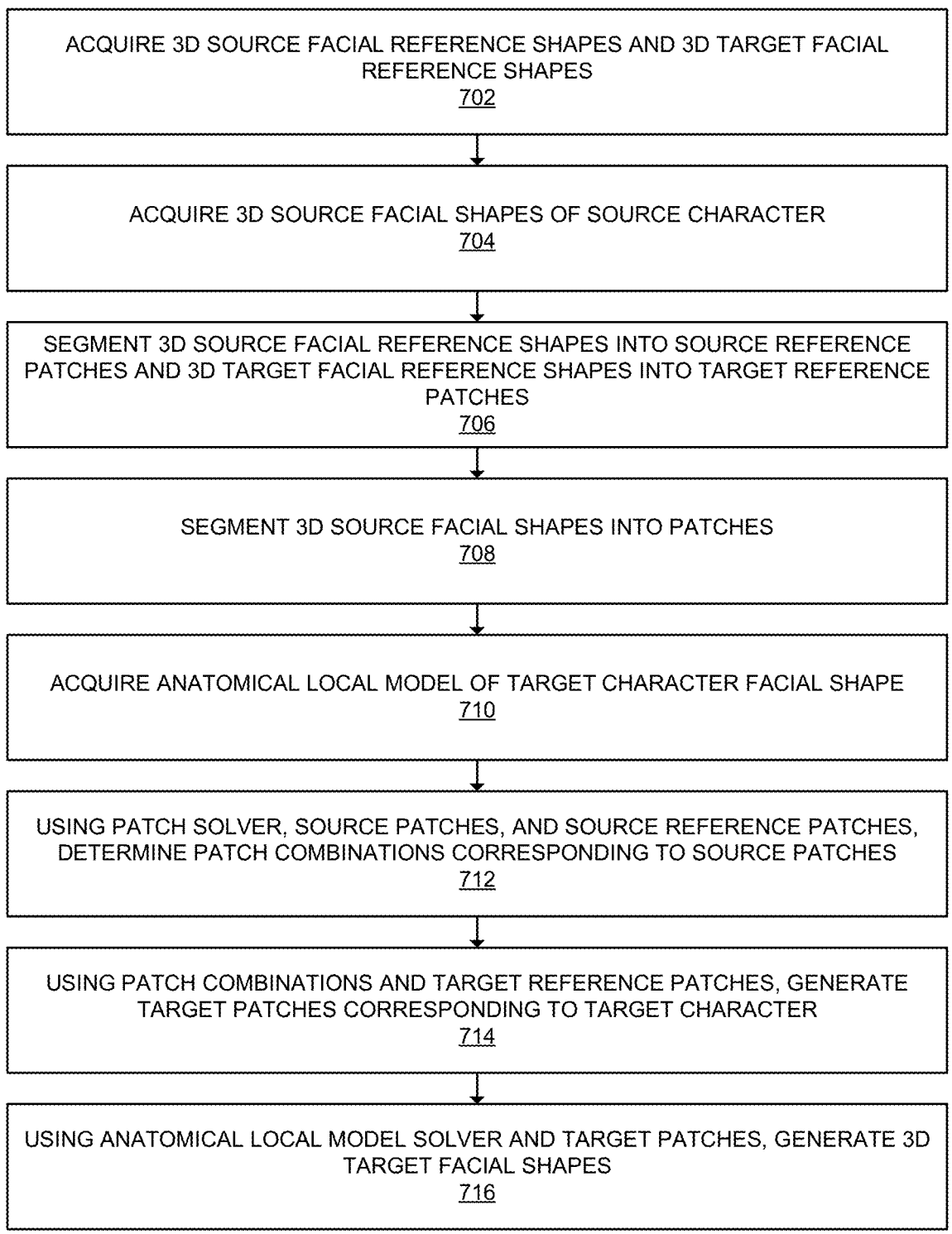
FIG. 7 shows a flowchart corresponding to a patch-based facial retargeting method according to some embodiments.

These methods are described in more detail below with reference to FIG. 7, which shows a flowchart comprising steps 702-716. It should be understood that some of these steps can be optional. For example, it is not strictly necessary for a practitioner to segment 3D source facial reference shapes themselves (e.g., in step 706), as the 3D source facial reference shapes could be pre-segmented prior to their acquisition by the practitioner (e.g., if they were purchased or received from another entity, rather than acquired using an actor scan or performance capture). It should also be understood that the ordering of steps presented in FIG. 7 is also somewhat optional. For example, a practitioner can acquire the 3D source facial shapes before or after acquiring the 3D source facial reference shapes. As another example, a practitioner can patch-segment the 3D source facial shapes before or after patch-segmenting the 3D source facial reference shapes.

It should be understood that the methods described below can be used to retarget an arbitrary number of 3D source facial shapes to 3D target facial shapes. This can be accomplished, for example, by repetition (e.g., retargeting a first 3D source facial shape to produce a first 3D target facial shape, then retargeting a second 3D source facial shape to produce a second 3D target facial shape, etc.) or by performing the method multiple times in parallel (e.g., simultaneously retargeting a first 3D source facial shape to produce a first 3D target facial shape and retargeting a second 3D source facial shape to produce a second 3D target facial shape, etc.). As such, descriptions of single 3D facial shapes, patches, patch combinations, etc., can usually also be understood in the context of multiple 3D facial shapes, patches, patch combinations, etc. As such, descriptions of methods according to embodiments in terms of single elements (3D facial shapes, patches, etc.) are not intended to be limiting.

A. Acquiring Facial Shapes

At step 702, a plurality of 3D source facial reference shapes (also referred to as 3D subject facial reference shapes) and a plurality of 3D target facial reference shapes (also referred to as 3D character facial reference shapes) can be acquired. Each 3D source facial reference shape can represent a different expression and can be in semantic correspondence with a corresponding 3D target facial reference shape.

The 3D facial reference shapes can be acquired or received via any appropriate method. In some embodiments, the 3D facial reference shapes may have been pre-generated, and acquiring the 3D facial reference shapes may comprise retrieving the 3D facial reference shapes from a memory element associated with a retargeting computer. As an alternative, 3D facial reference shapes corresponding to a computer-generated character can be created by a 3D artist or a team of 3D artists, using any appropriate 3D modeling tools. In some applications of embodiments, the target character can comprise a computer-generated character, and consequently the 3D target facial reference shapes can be generated by a 3D artist.

3D facial reference shapes corresponding to non-computer-generated characters (e.g., human actors or actresses), can be generated using actor scanning, facial performance tracking, or a facial performance capture system such as the Medusa facial performance capture system or the Anyma facial performance capture system. An actor or actress can be instructed to make a series of expressions corresponding to each of the 3D facial reference shapes. Images or video of the actor or actress making these expressions can be captured using a video camera. A facial performance capture system can then automatically convert these images or video to the 3D facial reference shapes.

Figure 8:
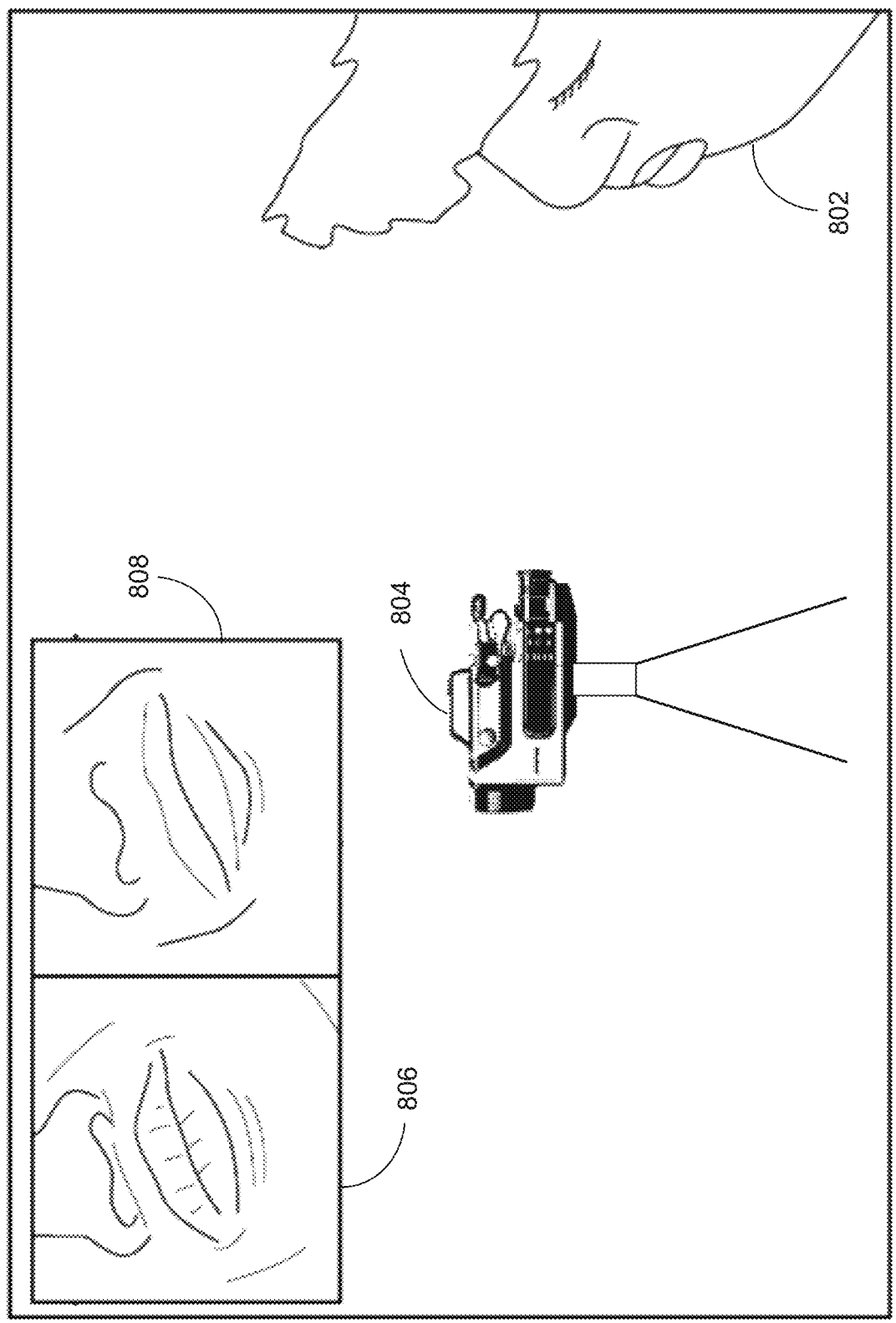
FIG. 8 shows an example of an environment including a system for capturing an image of a subject and performing facial performance tracking using motion data, according to some embodiments.

FIG. 8 shows an example of an environment including a system for capturing images of a subject 802 and performance facial performance capture (or tracking). 2D or 3D motion data may be determined from the images. Motion data may also be determined from markers attached to the face of the subject 802, from an illustration drawn or otherwise created by an artist, or from another suitable source. In some cases, 3D performance capture can be performed using a single point of view (e.g., from a camera view of a camera 804, from marker data, or from an illustration from an artist), in which case monocular face capture may be performed. In other cases, the motion data may be obtained from multiple points of view (e.g., multiple cameras, marker data, or an illustration), in which case multi-view face capture may be performed. Using the set-up shown in FIG. 8, the subject can make a facial expression 806 that is captured in an image from the camera 804. Motion data can be determined from the image using, for example, optical flow techniques. Using the motion data, a facial performance capture program running on a computer can perform techniques to render the output 808, including a reconstructed representation of the subject's facial expression (e.g., a 3D subject facial reference shape). In facial performance capture systems such as Anyma, the facial motion reconstruction can be performed in two steps, first by tracking local patches and bones using anatomical constrains, and then by combining the patches into a face mesh.

Returning to FIG. 7 and step 702, in some embodiments between 15 and 25 3D source facial reference shapes and 3D target facial reference shapes can be acquired. As such, the plurality of 3D source facial reference shapes can comprise 15-25 3D source facial reference shapes, and the plurality of 3D target facial reference shapes can comprise 15-25 3D target facial reference shapes. This relatively low number (i.e., 15-25) of facial reference shapes is one advantage of embodiments over other facial retargeting methods. Other methods, such as "blendshape rig retargeting" or deep-learning based retargeting techniques typically require a much larger number of 3D facial reference shapes. Consequently, embodiments of the present disclosure are usually less labor intensive and more memory efficient than these other techniques.

As stated above in Section I, the plurality of 3D source facial reference shapes and the plurality of 3D target facial reference shapes can be correspondence with each other. Additionally, the plurality of 3D source facial reference shapes and the plurality of 3D target facial reference shapes can be in a canonical coordinate frame and each can be centered at an origin. This may make it easier to compare or perform operations across 3D facial reference shapes (e.g., combining patches using a patch combination) as described further below.

At step 704, one or more 3D source facial shapes corresponding to the source character can be obtained. These 3D source facial shapes can also be referred to as subject facial shapes. The one or more 3D source facial shapes can comprise an input to the patch-based facial retargeting process, and may be used to produce one or more 3D target facial shapes. The one or more 3D source facial shapes can be acquired using any of the techniques described above. However, because the source character is more likely to comprise a human actor or actress, it is likely that the one or more 3D source facial shapes may be acquired using facial performance tracking (or capture).

The one or more 3D source facial shapes can correspond to one or more frames of animation (sometimes just referred to as "frames"), which can in turn correspond to an animated performance (e.g., a facial performance) by the source character. These one or more frames of animation may comprise a sequence of the one or more 3D source facial shapes, that when viewed sequentially comprise this animated performance. Each 3D source facial shape can correspond to a facial expression made by the source character during the facial performance. The one or more frames of animation can be generated using performance tracking, as described above with reference to FIG. 8, or using any other appropriate means (e.g., for computer-generated characters, the frames of animation may be generated by a 3D artist). If necessary, the one or more 3D source facial shapes can be obtained or extracted from the one or more frames.

As described above in Section I, the 3D facial shapes (i.e., the one or more 3D source facial shapes, the plurality of 3D source reference facial shapes, the plurality of 3D target reference facial shapes, etc.) can comprise geometric elements. For example, A 3D source facial shape can comprise a plurality of vertices or a plurality of polygons, and any subsets of geometric elements (e.g., in a patch) may comprise a subset of the plurality of vertices or a subset of the plurality of polygons. In some embodiments, the one or more 3D source facial shapes, the plurality of 3D source facial reference shapes, and the plurality of 3D target facial reference shapes can each correspond to a mesh topology, in other words, the 3D facial shapes may have a topological correspondence.

As described above in Section I, the 3D facial shapes can also be in vertex correspondence. In some embodiments, this vertex correspondence can be equivalent to the topological correspondence described above. In this vertex correspondence, for each vertex in each 3D facial shape, there may exist a corresponding vertex in each other 3D facial shape. In other words, if a 3D source facial shape comprises a first plurality of vertices, a 3D target facial shape (generated during the retargeting process) comprises a second plurality of vertices, each 3D source facial reference shape comprises a third plurality of vertices, and each 3D target facial reference shapes corresponds a fourth plurality of vertices, then the first plurality of vertices, the second plurality of vertices, each third plurality of vertices and each fourth plurality of vertices may be in correspondence, such that for each first vertex of the first plurality of vertices there exists a corresponding second vertex of the second plurality of vertices, a plurality of corresponding third vertices, and a plurality of corresponding fourth vertices.

B. Patch Segmentation

After the plurality of 3D source facial reference shapes, the plurality of 3D target facial reference shapes, and the one or more 3D source facial shapes have been acquired, they can be segmented into a plurality of source reference patches, a plurality of target reference patches, and a plurality of source patches respectively. There are a variety of ways that 3D facial shapes can be segmented into patches. As one example, 3D facial shapes can be segmented into patches using a segmentation algorithm, such as a deep learning based or contour-based segmentation algorithm. As another example, a 3D artist can segment 3D facial shapes using 3D modeling software. As a third example, 3D facial shapes can be segmented using a patch layout.

As described above, a patch layout can comprise data that defines the segmentation of a 3D facial shape into patches. A patch layout may comprise a UV layout (sometimes referred to as a UV mapping) or may be generated using a UV layout. Patch layouts or UV layouts can be generated or modified algorithmically, or using commercially available layout software.

At step 706, the plurality of 3D source facial reference shapes can be segmented into a plurality of source reference patches and the plurality of target facial reference shapes can be segmented into a plurality of target reference patches. In some embodiments, this can comprise generating a source patch layout (sometimes referred to as a subject patch layout) and segmenting each of the plurality of 3D source facial reference shapes (sometimes referred to as 3D subject facial reference shapes) into a plurality of source reference patches (sometimes referred to as a plurality of subject patches). Similarly, step 706 can comprise generating a target patch layout (sometime referred to as a character patch layout) and segmenting each of the plurality of 3D target facial reference shapes (sometimes referred to as 3D character facial reference shapes) into a plurality of target reference patches (sometimes referred to as a plurality of character patches). In some embodiments, the source patch layout and the target patch layout may be the same, or may be derived from the same UV layout. The source reference patches and target reference patches can be in correspondence, such that each target reference patch (character patch) of the plurality of target reference patches is mapped to a corresponding source reference patch (subject patch) of the plurality of source reference patches.

Likewise, at step 708, the one or more 3D source facial shapes (sometimes referred to as 3D subject facial shapes) can be segmented into a plurality of source patches (sometimes referred to as a plurality of subject patches) corresponding to the 3D source facial shape and a source character. Each source patch of the plurality of source patches can comprise geometric elements corresponding to its respective 3D source facial shape. Like the plurality of 3D source facial reference shapes, the one or more 3D source facial shapes can be segmented into the plurality of source patches using a source patch layout. This step can be performed on a frame by frame basis, i.e., for each frame of one or more frames of animation, the 3D source facial shape corresponding to that patch can be segmented into a corresponding plurality of source patches. These segmentation processes can be performed in parallel, in order to decrease the total amount of time needed to patch segment the one or more 3D source facial shapes.

As described above in Section I, patches, including the plurality of source patches, the plurality of source reference patches, the plurality of target patches, and the plurality of target reference patches can have overlapping boundaries. Additionally, in some embodiments, the plurality of source patches can comprise between 50 and 250 (inclusive) source patches. Likewise, the plurality of source reference patches can comprise between 50 and 250 (inclusive) source reference patches per 3D source facial reference shape, and the plurality of target reference patches can comprise between 50 and 250 (inclusive) target reference patches per 3D target facial reference shape. There is no definite optimal number of patches per 3D facial reference shape. In many applications, approximately 100 patches is suitable for performing patch-based facial retargeting.

The plurality of source reference patches can be referred to or comprise a plurality of patch blendshapes, a plurality of patch morph targets, and/or a plurality of patch shape keys. The term blendshape, morph target, and shape key generally refer to the same concept in 3D modeling and design. A patch combination (described with reference to step 712 below) can comprise a linear combination of the plurality of reference patches, and therefore may comprise a linear combination of patch blendshapes, patch morph targets, and/or patch shape keys.

In some embodiments, rigid motion can be removed from the one or more 3D source facial shapes (subject facial shapes) prior to generating the plurality of source patches, leaving behind facial deformations of the 3D source facial shapes in a canonical coordinate frame. As described above in Section I, rigid motion can comprise motion or deformation that affects the 3D source facial shapes as a whole, rather than affecting individual locations on the 3D source facial shapes. Rotation, translation, and reflection are all examples of rigid motion. Removing the rigid motion from the source facial shape may prevent the rigid motion from being inadvertently transferred to the target character during retargeting. There are a variety of ways in which rigid motion can be removed including comparing the 3D source facial shapes to the 3D source facial reference shapes, using a rigid motion solver, etc. Further, in some embodiments, a global rigid head pose can be solved for in order to remove any minor errors remaining after using other rigid motion removal techniques. Solving for a global rigid head pose can allow any blend weights (described further below in Section IID) to solely account for facial deformation and not represent or include minor head motion.

C. Acquiring Anatomically-Constrained Model of the Target Character

At step 710, an anatomical local model can be generated for 3D target character facial shapes. This anatomical local model can later be used with an anatomical local model solver to generate 3D target facial shapes at step 716, completing the facial retargeting process. As described above in Section I, an anatomical local model can comprise both a Generating the anatomical local model can comprise determining a plurality of local shape subspaces for the plurality of anatomical patches. Each local shape subspace can include a local shape deformation of a corresponding anatomical patch. A local shape subspace for an anatomical patch can include a plurality of deformation shapes for that anatomical patch. These deformation shapes can define a deformation of that anatomical patch for a facial expression. Additionally, generating the anatomical local model can comprise determining an anatomical subspace. The anatomical subspace can include tissue thickness constraints for the plurality of anatomical patches and an anatomical bone structure. The anatomical subspace can globally constrain local shape deformations and tissue thickness for the plurality of anatomical patches and the anatomical bone structure using one or more tissue thickness constraints. These tissue thickness constrains can be determined for the plurality of deformation shapes using the plurality of anatomical patches. The anatomically-constrained model of the target character can then be generated by combining the plurality of local shape subspaces and the anatomical subspace.

D. Generating Patch Combination

At step 712, a patch solver, the source patches, and the source reference patches can be used to determine patch combinations corresponding to the source patches. As described above in Section I, a patch combination can comprise an expression (e.g., a mathematical expression) relating a source patch to a plurality of source reference patches, or alternatively instructions that can be used to combine a plurality of source reference patches to generate a source patch. As described above in Section I, a patch solver can generate patch combinations and evaluate those patch combinations using an error or loss function, which generally relates how effective a particular patch combination is at generating the corresponding source patch.

As such, at step 712, a retargeting computer (or any other appropriate entity) can generate a patch combination for each source patch of the plurality of source patches (generated during patch segmentation of the 3D source facial shape(s)), thereby generating a plurality of patch combinations. Each of these patch combinations can be generated using a patch solver and a plurality of source reference patches, which may have been generated during patch segmentation of the 3D source facial reference shapes. Each source reference patch can correspond to a different 3D source facial reference shapes, thereby, the plurality of source reference patches may correspond to the plurality of 3D source facial reference shapes.

Each patch combination may comprise a linear combination of a corresponding plurality of source reference patches. The "weight" assigned to each source reference patch in the linear combination can be referred to as a "blend weight." As such, each patch combination of the plurality of patch combinations may comprise a plurality of blend weights. The plurality of source reference patches can also be referred to as (or comprise) a plurality of patch blendshapes, a plurality of patch morph targets, and/or a plurality of patch shape keys.

As described above in Section I, there are a variety of techniques that can be used to implement a (linear or non-linear) patch solver. One such method is the use of an error function and candidate solutions (i.e., candidate patch combinations and candidate source patches). The error function can be used to evaluate the candidate solutions, and a candidate solution can be selected based on the resulting error metrics.

As one example, for each source patch, the patch solver can generate one or more candidate patch combinations corresponding to that source patch. These candidate patch combinations can be generated via any appropriate means (e.g., randomly, algorithmically, etc.) The one or more candidate patch combinations and the plurality of source reference patches can be used to generate one or more candidate source patches. Using an error function, each of the one or more candidate patch combinations can be evaluated by comparing each candidate source patch of the one or more candidate source patches to the source patch, thereby generating one or more error metrics. The error metrics could comprise, for example, root-mean-square (RMS) error values corresponding to a plurality of Euclidean distances between a plurality of source vertices corresponding to the source patch and a plurality of candidate vertices corresponding to a candidate source patch of the one or more source patches (as described above in Section I).

Each error metric can be evaluated to determine if any of the candidate source patches comprise an acceptable solution for the solver. As an example, the solver can select a patch combination from the one or more candidate patch combinations based on a corresponding error metric of the one or more error metrics that is the minimum error metric of the one or more error metrics. In other words, the solver can output the candidate patch combination corresponding to the best solution based on the error metric.

As an alternative, each error metric can be compared against an error metric threshold, such that the selected candidate patch combination corresponds to an error metric that is less than the error metric threshold. If each error metric of the one or more error metrics is greater than the error metric threshold, i.e., no candidate patch combination is an acceptable solution, an additional set of candidate patch combinations can be generated and evaluated using the error function until a candidate patch combination is determined that corresponds to an error metric less than the error metric threshold.

As described above in Section I, the error function can include addition regularizers, including an adjacency regularizer and a blend weight regularizer. The one or more error metrics produced by the patch solver may be proportional to the adjacency regularizer (e.g., increasing in value if a candidate patch is dissimilar from adjacent patches) and the blend weight regularizer (e.g., increasing in value if the blend weights associated with a candidate patch are large or larger than a threshold).

The patch combinations may also be referred to as deformations of subject performance patches. As such, step 712 can comprise, for each subject performance patch of the plurality subject performance patches, representing a deformation of the subject performance patch (i.e., a patch combination) using a corresponding subject patch model (e.g., a defined relationship between the subject performance patch and subject reference patches) and a non-linear patch solver, wherein the corresponding subject patch model is a subject patch model of a plurality of subject patch models (e.g., corresponding to each subject performance patch), and wherein each subject patch model defines a subject patch as a linear combination of corresponding patches in a plurality of 3D subject facial reference shapes.

E. Retargeting Using Patch Combination

At step 714, a plurality of target patches (also referred to as character performance patches) can be generated using the plurality of patch combinations (also referred to as deformation of the subject performance patch) and the plurality of target reference patches corresponding to a plurality of 3D target facial reference shapes, the target character, and optionally a plurality of character patch models. Each character patch model can define a character patch as a linear combination of corresponding patches in a plurality of 3D character facial reference shapes.

This can be accomplished using any of the techniques described above in Section I, or any other appropriate techniques. For example, each patch combination of the plurality of patch combinations may comprise a plurality of blend weights, and generating the plurality of target patches using the plurality of patch combinations and the plurality of target reference patches can comprise, for each target patch: applying the plurality of blend weights to the plurality of target reference patches (e.g., scaling each of the plurality of target reference patches according to the corresponding blend weight), thereby generating a plurality of weighted target reference patches. Afterwards, the weighted target reference patches can be combined in a linear combination (e.g., a summation) to generate the target patch, thereby generating a plurality of target patches. As described above, the plurality of target patches can comprise between 50 and 250 (inclusive) patches.

F. Combining Target Character Patches

After performing retargeting using patch combinations, a practitioner can possess a plurality of 3D target character patches with overlapping boundaries. These target character patches collectively make up a 3D target character facial shape corresponding to a particular input frame of animation. A practitioner can optionally "stitch" these patches together in order to generate the 3D target facial shape corresponding to that input frame. This stitched 3D target facial shape can be used as the input to an anatomical local model solver in order to produce an "on-model" 3D target facial reference shape, as described below.

There are a variety of techniques that can be used to stitch patches together to generate the 3D target facial shape. As an example, if both patches and 3D target facial shapes are modeled as collections or sets of geometric elements (e.g., vertices, edges), the act of stitching patches together can effectively comprise the act of generating a set of geometric elements (corresponding to the 3D target facial shape) from a plurality of sets of elements (corresponding to each of the target patches). Thus the set union operator or a variant can be used to generate the 3D target facial shape from the plurality of target patches.

However, because of their overlapping boundaries, a patch can comprise geometric elements that are unique to that patch and one or more boundary geometric elements that may be common to multiple patches. It is possible that during the retargeting process, these boundary geometric elements can become "misaligned," that is, in one patch a particular geometric element (e.g., vertex) has a particular position, but in an adjacent patch, that particular geometric element has a different position, leading to a situation where a geometric element has two (or more) distinct positions. This situation can occur, for example, if the patch combinations corresponding to two adjacent patches are different. As such, prior to combining the patch sets into a single 3D target facial shape sets, it may be desirable to rectify differences in boundary geometric elements. There are a variety of ways this can be accomplished. As one example, if a geometric element has multiple positions associated with it, those positions can be averaged to produce a single position, which can then be assigned to that particular geometric element. This process can be performed until each geometric element only has a single position associated with it. The 3D target facial shape can then comprise all the geometric elements with only a single associated position (e.g., in a vertex mesh).

G. Generating 3D Target Facial Shape Using Anatomical Local Model

At step 716, an anatomical local model solver can be used to generate anatomically-constrained 3D target facial shapes (sometimes just referred to as 3D target facial shapes or 3D character facial shapes), completing the retargeting process. The anatomical local model solver can either use stitched 3D target facial shapes or the plurality of target patches as an input. The anatomical local model solver can generate the 3D target facial shape by determining anatomical parameters corresponding to the anatomically constrained model of the target (e.g., computer-generated) character, thereby generating one or more 3D target facial shapes. As described above, the anatomically-constrained model can comprise a combination of a plurality of local shape subspaces and an anatomical subspace.

In some embodiments, due to a difference in the number of patches used by ALM and the number of patches used in patch-based facial retargeting, the plurality of target patches can be further subdivided into anatomical patches. Alternatively, a stitched 3D target facial shape can be subdivided into anatomical patches, using any appropriate segmentation process (e.g., algorithmic segmentation, segmentation according to a patch layout or UV layout, etc.)

Using an anatomical local model solver to produce the 3D target facial shape(s) can eliminate seams, tearing, or other visually displeasing artifacts. Additionally, the anatomical local model solver puts the 3D target character facial shape "on model" (i.e., conforming to the ALM), which may make it easier for artists or filmmakers to modify or manipulate the model using the ALM parameters. The end result is a 3D facial performance by the target character corresponding to the input 3D facial performance by the source character, effectively completing the 3D facial retargeting process.

III. Computer System

Figure 9:
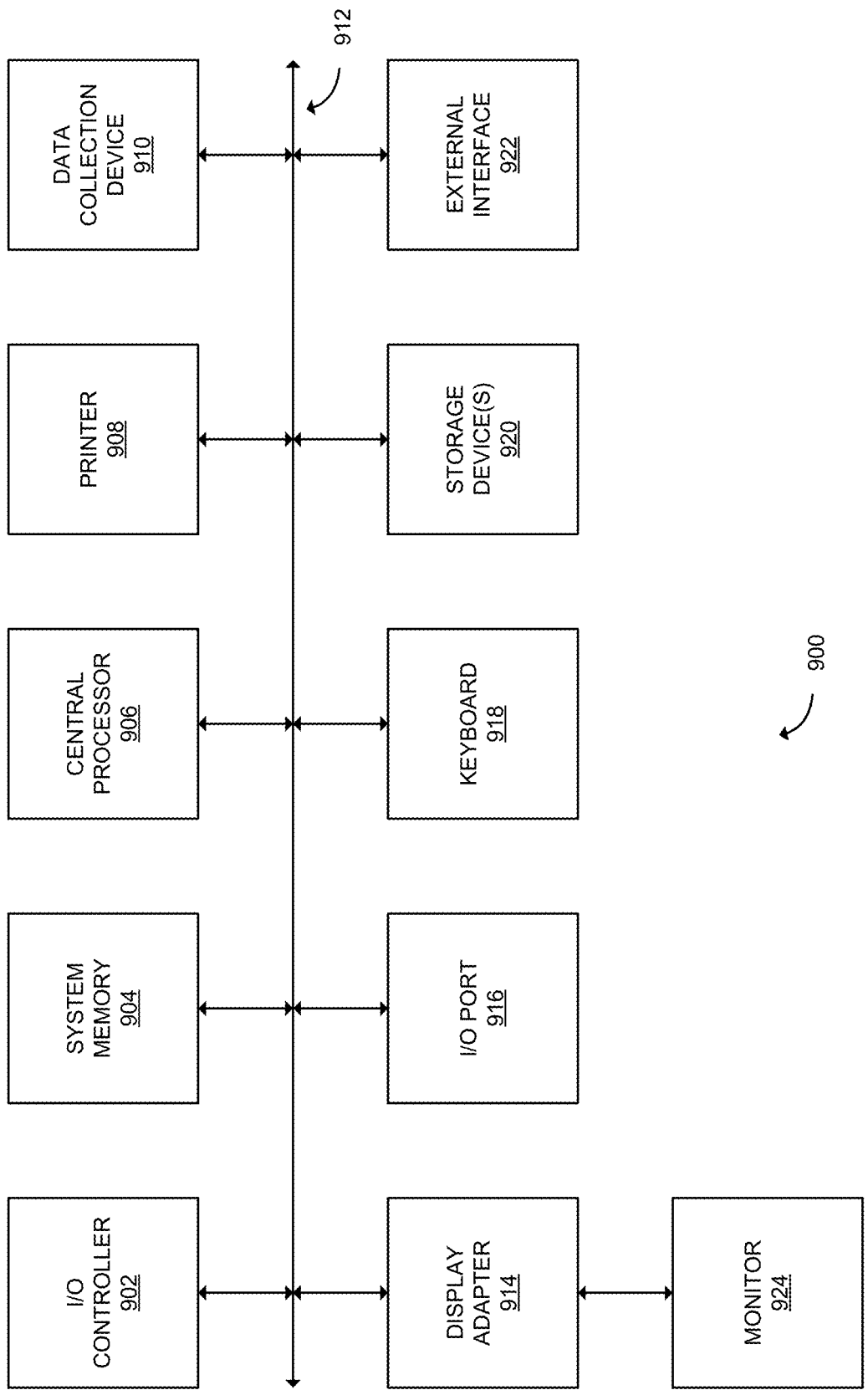
FIG. 9 shows an exemplary computer system according to some embodiments.

Any of the computer systems mentioned herein may utilize any suitable number of subsystems. Examples of such subsystems are shown in FIG. 9 in computer system 900. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 9 are interconnected via a system bus 912. Additional subsystems such as a printer 908, keyboard 918, storage device(s) 920, monitor 924 (e.g., a display screen, such as an LED), which is coupled to display adapter 914, and others are shown. Peripherals and input/output (I/O) devices, which couple to I/O controller 902, can be connected to the computer system by any number of means known in the art such as input/output (I/O) port 916 (e.g., USB, FireWire®). For example, I/O port 916 or external interface 922 (e.g. Ethernet, Wi-Fi, etc.) can be used to connect computer system 900 to a wide area network such as the Internet, a mouse input device, or a scanner. The interconnection via system bus 912 allows the central processor 906 to communicate with each subsystem and to control the execution of a plurality of instructions from system memory 904 or the storage device(s) 920 (e.g., a fixed disk, such as a hard drive, or optical disk), as well as the exchange of information between subsystems. The system memory 904 and/or the storage device(s) 920 may embody a computer readable medium. Another subsystem is a data collection device 910, such as a camera, microphone, accelerometer, and the like. Any of the data mentioned herein can be output from one component to another component and can be output to the user.

A computer system can include a plurality of the same components or subsystems, e.g., connected together by external interface 922, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Any of the computer systems mentioned herein may utilize any suitable number of subsystems. In some embodiments, a computer system includes a single computer apparatus, where the subsystems can be components of the computer apparatus. In other embodiments, a computer system can include multiple computer apparatuses, each being a subsystem, with internal components.

A computer system can include a plurality of the components or subsystems, e.g., connected together by external interface or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can be involve computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be involve specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art Although the disclosure has been described with respect to specific embodiments, it will be appreciated that the disclosure is intended to cover all modifications and equivalents within the scope of the following claims.

What is claimed is:

1. A computer-implemented method of performing facial animation retargeting from a source character to a target character, the method comprising:
   generating a plurality of source patches corresponding to a three-dimensional (3D) source facial shape and the source character, each source patch of the plurality of source patches comprising geometric elements corresponding to the 3D source facial shape;
   generating a patch combination for each source patch of the plurality of source patches, thereby generating a plurality of patch combinations corresponding to the plurality of source patches, wherein each patch combination is generated using a patch solver and a plurality of source reference patches, the plurality of source reference patches corresponding to a plurality of 3D source facial reference shapes;
   generating a plurality of target patches using the plurality of patch combinations corresponding to the plurality of source patches and a plurality of target reference patches, the plurality of target reference patches corresponding to a plurality of 3D target facial reference shapes and the target character, wherein each target reference patch of the plurality of target reference patches corresponds to a corresponding source reference patch of the plurality of source reference patches; and
   generating a 3D target facial shape using an anatomical model solver and the plurality of target patches, wherein the anatomical model solver generates the 3D target facial shape by determining anatomical parameters corresponding to an anatomically-constrained model of the target character, and wherein the anatomically-constrained model comprises a combination of a plurality of local shape subspaces and an anatomical subspace.

2. The method of claim 1, wherein the plurality of 3D source facial reference shapes and the plurality of 3D target facial reference shapes are in a canonical coordinate frame and centered at an origin.

3. The method of claim 1, further comprising removing rigid motion of the 3D source facial shape prior to generating the plurality of source patches.

4. The method of claim 1, wherein the 3D source facial shape comprises a plurality of vertices or a plurality of polygons, and wherein the geometric elements comprises a subset of the plurality of vertices or a subset of the plurality of polygons.

5. The method of claim 1, wherein the plurality of source reference patches comprise a plurality of patch blendshapes, a plurality of patch morph targets, and/or a plurality of patch shape keys, and wherein the patch combination comprises a linear combination of the plurality of source reference patches.

6. The method of claim 1, wherein each patch combination of the plurality of patch combinations comprises a plurality of blend weights, and wherein generating the plurality of target patches using the plurality of patch combinations corresponding to the plurality of source patches and the plurality of target reference patches comprises, for each target patch:
   applying the plurality of blend weights to the plurality of target reference patches, thereby generating a plurality of weighted target reference patches; and
   combining the plurality of weighted target reference patches in a linear combination, thereby generating the target patch, thereby generating the plurality of target patches.

7. The method of claim 1, further comprising, prior to generating the 3D target facial shape using the anatomical model solver and the plurality of target patches:
   determining the plurality of local shape subspaces for a plurality of anatomical patches, each local shape subspace including a local shape deformation of a corresponding anatomical patch, wherein a local shape subspace for a patch includes a plurality of deformation shapes for the anatomical patch, and wherein a deformation shape of the anatomical patch defines a deformation of the anatomical patch for a facial expression;
   determining the anatomical subspace, the anatomical subspace including tissue thickness constraints for the plurality of anatomical patches and an anatomical bone structure, the anatomical subspace globally constraining local shape deformation and tissue thickness for the plurality of anatomical patches and an anatomical bone structure using one or more tissue thickness constraints determined for the plurality of deformation shapes of the plurality of anatomical patches; and
   generating the anatomically-constrained model of the target character by combining the plurality of local shape subspaces and the anatomical subspace.

8. The method of claim 1, wherein:
   the plurality of source patches have overlapping boundaries;
   the plurality of source reference patches have overlapping boundaries;
   the plurality of target patches have overlapping boundaries; and
   the plurality of target reference patches have overlapping boundaries.

9. The method of claim 1, wherein the 3D source facial shape corresponds to a mesh topology, and wherein:
   the 3D target facial shape corresponds to the mesh topology;
   the plurality of 3D source facial reference shapes correspond to the mesh topology; and
   the plurality of 3D target facial reference shapes corresponds to the mesh topology.

10. The method of claim 1, wherein the 3D source facial shape comprises a first plurality of vertices, the 3D target facial shape comprises a second plurality of vertices, each 3D source facial reference shape comprises a third plurality of vertices, and each 3D target facial reference shape comprises a fourth plurality of vertices, and wherein the first plurality of vertices, the second plurality of vertices, each third plurality of vertices and each fourth plurality of vertices are in correspondence, such that for each first vertex of the first plurality of vertices there exists a corresponding second vertex of the second plurality of vertices, and plurality of corresponding third vertices, and a plurality of corresponding fourth vertices.

11. The method of claim 1, wherein the 3D source facial shape is one of one or more 3D source facial shapes corresponding to one or more frames of animation, the one or more frames of animation corresponding to an animated performance by the source character, and wherein the method further comprises obtaining the 3D source facial shape from the one or more frames of animation prior to generating the plurality of source patches.

12. The method of claim 11, further comprising generating the one or more frames of animation using facial performance tracking.

13. The method of claim 1, wherein the patch solver comprises a non-linear patch solver, and wherein generating the patch combination for each source patch comprises:
 generating one or more candidate patches combinations;
 generating one or more candidate source patches using the one or more candidate patch combinations;
 using an error function to evaluate each of the one or more candidate patch combinations by comparing each candidate source patch of the one or more candidate source patches to the source patch, thereby generating one or more error metrics; and
 selecting the patch combination from the one or more candidate patch combinations based on a corresponding error metric of the one or more error metrics, wherein the patch combination corresponds to a minimum error metric of the one or more error metrics, or wherein the patch combination corresponds to an error metric that is less than an error metric threshold.

14. The method of claim 13, wherein the error function additionally includes an adjacency regularizer and a blend weight regularizer, and wherein the one or more error metrics are proportional to the adjacency regularizer and the blend weight regularizer.

15. The method of claim 13, wherein each of the one or more error metrics comprise a root-mean-square error value corresponding to a plurality of Euclidean distances between a plurality of source vertices corresponding to the source patch and a plurality of candidate vertices corresponding to a candidate source patch of the one or more candidate source patches.

16. The method of claim 1, wherein:
 the plurality of source patches comprise between 50 and 250 (inclusive) source patches;
 the plurality of source reference patches comprises between 50 and 250 (inclusive) source reference patches per 3D source facial reference shape;
 the plurality of target patches comprise between 50 and 250 (inclusive) target patches; and
 the plurality of target reference patches comprise between 50 and 250 (inclusive) target reference patches per 3D target facial reference shape.

17. The method of claim 1, wherein:
 the plurality of 3D source facial reference shapes comprises between 15-25 3D source facial reference shapes; and
 the plurality of 3D target facial reference shapes comprises between 15-25 3D target facial reference shapes.

18. The method of claim 1, wherein the patch solver also solves for a rigid transformation of the face.

19. The method of claim 1, wherein the patch combination generated by the patch solver is modified by an artist or by other means before being transferred onto the target subject.

20. A computer-implemented method of transferring a facial performance from a subject to a computer-generated character, the method comprising:
 receiving one or more frames representing at least a portion of the facial performance by the subject, wherein each frame of the one or more frames includes a three-dimensional (3D) subject facial shape corresponding to a facial expression of the subject during the facial performance; and
 (a) for each frame of the one or more frames:
 removing rigid motion of the 3D subject facial shape;
 segmenting the 3D subject facial shape into a plurality of subject performance patches with overlapping boundaries using a subject patch layout comprising a plurality of subject patches having overlapping boundaries;
 for each subject performance patch of the plurality of subject performance patches:
 representing a deformation of the subject performance patch using a corresponding subject patch model and a non-linear patch solver, wherein the corresponding subject patch model is a subject patch model of a plurality of subject patch models, wherein each subject patch model defines a subject patch as a linear combination of corresponding patches in a plurality of 3D subject facial reference shapes;
 generating a corresponding character performance patch using the deformation of the subject performance patch and a corresponding character patch model, thereby generating a plurality of character performance patches, wherein the corresponding character patch model is a character patch model of a plurality of character patch models, wherein each character patch model defines a character patch as a linear combination of corresponding patches in a plurality of 3D character facial reference shapes, wherein the plurality of 3D character facial reference shapes are defined by a character patch layout, wherein the character patch layout comprises a plurality of character patches having overlapping boundaries, and wherein each character patch of the plurality of character patches is mapped to a corresponding subject patch of the plurality of subject patches; and
 generating a 3D character facial shape using the plurality of character performance patches and an anatomically-constrained model of the computer-generated character, thereby generating one or more 3D character facial shapes corresponding to the one or more frames.

21. The method of claim 20, further comprising, prior to step (a):
 receiving the plurality of 3D subject facial reference shapes and the plurality of 3D character facial reference shapes, wherein each 3D subject facial reference shape represents a different facial expression and is in semantic correspondence with a corresponding 3D character facial reference shape;
 generating the subject patch layout;
 generating the character patch layout;
 segmenting each of the plurality of 3D subject facial reference shapes into the plurality of subject patches using the subject patch layout;

segmenting each of the plurality of 3D character facial reference shapes into the plurality of character patches using the character patch layout;

generating a subject patch model for each subject patch in the subject patch layout, thereby generating the plurality of subject patch models; and generating a character patch model for each character patch in the character patch layout, thereby generating the plurality of character patch model.

22. A system for performing facial animation retargeting, the system comprising:

one or more processors; and a non-transitory computer readable medium coupled to the one or more processors, the non-transitory computer readable medium comprising instructions executable by the processor to cause the system to:

generate a plurality of source patches corresponding to a three-dimensional (3D) source facial shape corresponding to a source character, each source patch of the plurality of source patches comprising geometric elements corresponding to the 3D source facial shape;

generate a patch combination for each source patch of the plurality of source patches, thereby generating a plurality of patch combinations corresponding to the plurality of source patches, wherein each patch combination is generated using a patch solver and a plurality of source reference patches, the plurality of source reference patches corresponding to a plurality of 3D source facial reference shapes;

generate a plurality of target patches using the plurality of patch combinations corresponding to the plurality of source patches and a plurality of target reference patches, the plurality of target reference patches corresponding to a plurality of 3D target facial reference shapes and a target character, wherein each target reference patch of the plurality of target reference patches corresponds to a corresponding source reference patch of the plurality of source reference patches; and generate a 3D target facial shape using an anatomical model solver and the plurality of target patches, wherein the anatomical model solver generates the 3D target facial shape by determining anatomical parameters corresponding to an anatomically-constrained model of the target character, and wherein the anatomically-constrained model comprises a combination of a plurality of local shape subspaces and an anatomical subspace.

* * * * *